(12) United States Patent
Kataoka

(10) Patent No.: US 7,516,197 B1
(45) Date of Patent: Apr. 7, 2009

(54) CONTROL CONTENT TRANSMISSION METHOD AND STORAGE-BASED BROADCASTING SYSTEM

(75) Inventor: Mitsuteru Kataoka, Katano (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 09/691,248

(22) Filed: Oct. 19, 2000

(30) Foreign Application Priority Data

Oct. 21, 1999 (JP) .................................. 11-299664

(51) Int. Cl.
*G06F 15/16* (2006.01)
(52) U.S. Cl. ...................................... 709/219; 709/203
(58) Field of Classification Search ................ 713/201; 715/140, 142, 134, 132, 110, 89; 709/203, 709/219, 217, 230–231, 220–222
See application file for complete search history.

(56) References Cited

U.S. PATENT DOCUMENTS

| | | | | |
|---|---|---|---|---|
| 5,247,575 A * | 9/1993 | Sprague et al. ................ 705/53 |
| 5,768,539 A | 6/1998 | Metz et al. |
| 5,784,608 A * | 7/1998 | Meske et al. .................... 707/2 |
| 5,802,518 A * | 9/1998 | Karaev et al. ................... 707/9 |
| 5,826,242 A * | 10/1998 | Montulli ....................... 705/27 |
| 5,835,087 A * | 11/1998 | Herz et al. ................... 345/810 |
| 5,848,412 A * | 12/1998 | Rowland et al. ................ 707/9 |
| 5,877,755 A * | 3/1999 | Hellhake ...................... 725/114 |
| 6,216,141 B1 * | 4/2001 | Straub et al. ................. 715/513 |
| 6,263,507 B1 * | 7/2001 | Ahmad et al. ................ 725/134 |
| 6,278,448 B1 * | 8/2001 | Brown et al. ................. 715/866 |
| 6,330,566 B1 * | 12/2001 | Durham .................... 707/104.1 |
| 6,452,609 B1 * | 9/2002 | Katinsky et al. ............. 715/716 |
| 6,516,349 B1 * | 2/2003 | Lieberman ................... 709/225 |
| 6,526,144 B2 * | 2/2003 | Markandey et al. ........... 380/28 |
| 6,615,212 B1 * | 9/2003 | Dutta et al. .................... 707/10 |
| 6,751,735 B1 * | 6/2004 | Schell et al. ................. 713/189 |
| 2003/0031186 A1 * | 2/2003 | Kataoka ...................... 370/400 |
| 2003/0137531 A1 * | 7/2003 | Katinsky et al. ............. 345/716 |

FOREIGN PATENT DOCUMENTS

| | | |
|---|---|---|
| EP | 1094403 A1 * | 4/2001 |
| KR | 1999-0075943 | 10/1999 |
| WO | 97/50207 | 12/1997 |

OTHER PUBLICATIONS

Information Technology—Generic coding of moving pictures and associated audio information: Systems, ISO/IEC 13818-1, Second Edition, Dec. 1, 2000, pp. 18-19 and 48-49.

(Continued)

*Primary Examiner*—Aaron Strange
(74) *Attorney, Agent, or Firm*—Wenderoth, Lind & Ponack, L.L.P.

(57) ABSTRACT

In a storage-based broadcasting system that automatically updates a viewer and provides a user interface unique to a service, a transmitting apparatus transmits a control content for realizing the user interface as the entire content or part of the content. A receiving apparatus receives and activates the transmitted control content for executing the user interface.

17 Claims, 21 Drawing Sheets

OTHER PUBLICATIONS

Information Technology—Generic coding of moving pictures and associated audio information, Part 6: Extensions for Digital Storage Media Command and Control , ISO/IEC 13818-6, Feb. 21, 1997, pp. 267-269 and 295-296.

Receiver for Digital Broadcasting, Chapter 12: Download Function, ARIB STD-B21 ver. 4.0, pp. 120-134, date unknown.

Data Coding and Transmission Specification For Digital Broadcasting, Chapter 6: Data Carousel Transmission Method, ARIB STD-B24 ver. 3.6, Feb. 6, 2003, pp. 14-15 and 31-32.

Patent Abstract of Japan, vol. 1998, No. 14, Dec. 31, 1998 & JP 10 240647 a (PFU LTD), Sep. 11, 1998, "abstract".

Database EPODOC On line, European Patent Office, the Hague, NL; XP002158254 *abstract* & KR 9 502 164 A (Mun Sang Jae), date unknown.

Kinoshita S. et al.: "The Real push Network: A New Push-type Content Delivery System Using Reliable Multicasting", IEEE Transactions on Consumer Electronics, US, IEEE Inc. NY, vol. 44, No. 4, Nov. 1998, pp. 1216-1223, XP000871418, ISSN: 0098-3063, * p. 1216, left-hand column, line 1—p. 1218, left-hand column, line 51; Figures 1-3 *.

* cited by examiner

Fig. 2
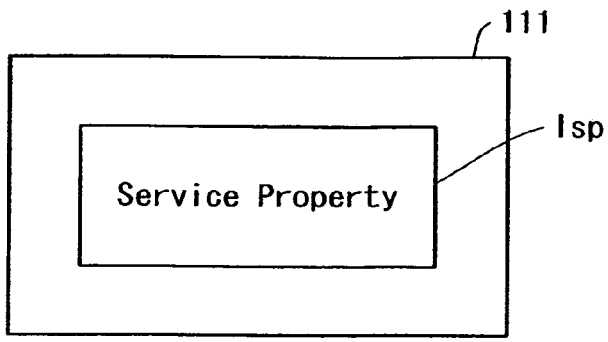
Fig. 3
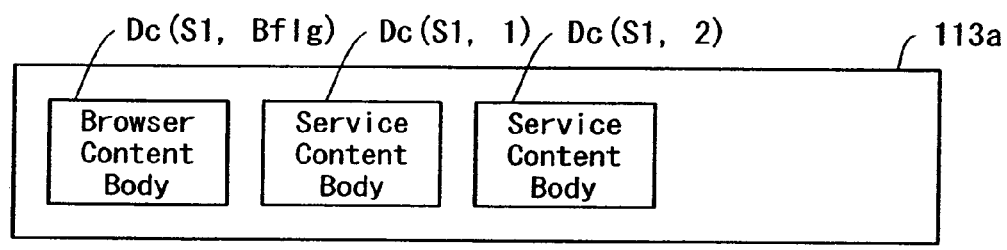
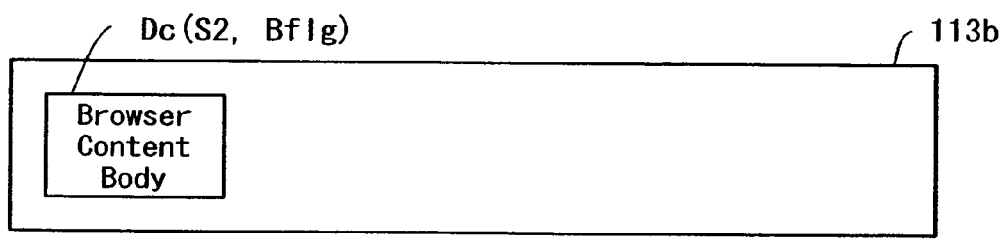
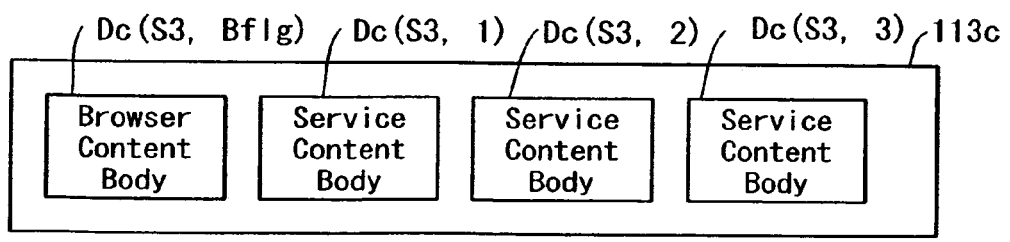

Fig. 4

| Service ID | Service Name |
|---|---|
| S 1 | Today's News |
| S 2 | Useful Information |
| S 3 | New Car Guide |

Isp

Fig. 5

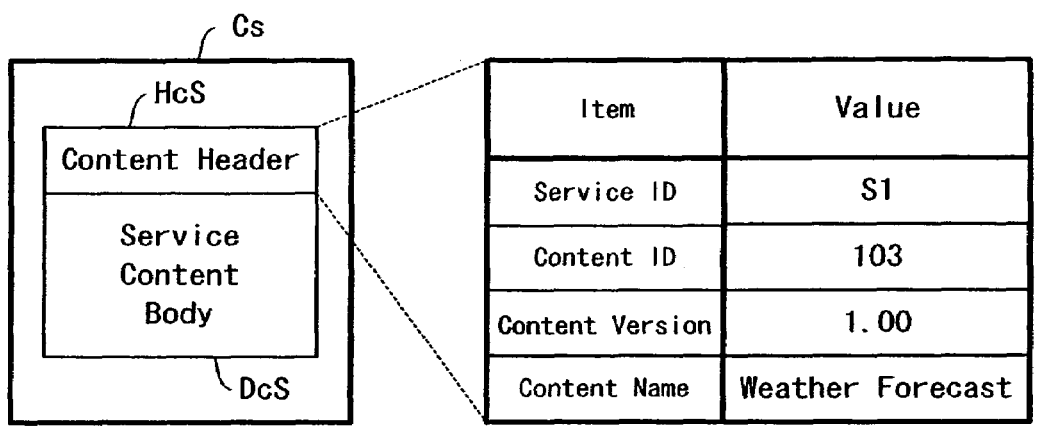

Cs, HcS, Content Header, Service Content Body, DcS

| Item | Value |
|---|---|
| Service ID | S1 |
| Content ID | 103 |
| Content Version | 1.00 |
| Content Name | Weather Forecast |

Fig. 6

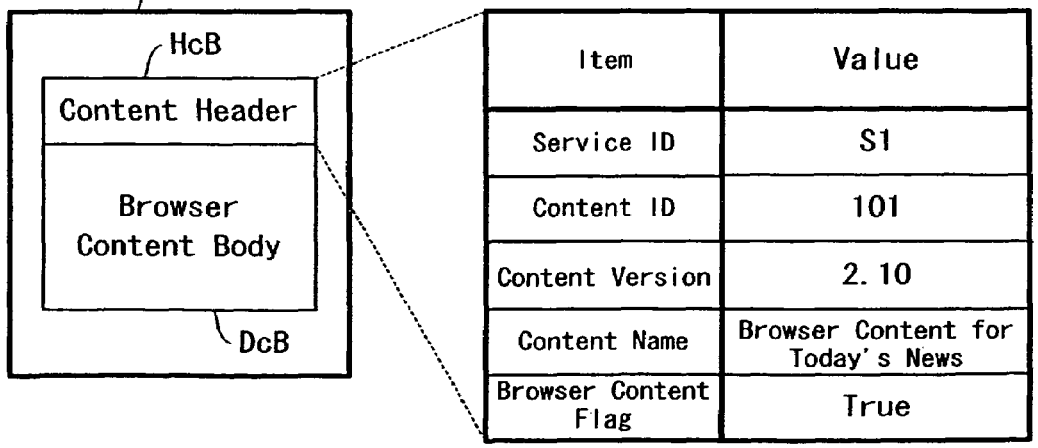

Cb = C(S1, Bflg), HcB, Content Header, Browser Content Body, DcB

| Item | Value |
|---|---|
| Service ID | S1 |
| Content ID | 101 |
| Content Version | 2.10 |
| Content Name | Browser Content for Today's News |
| Browser Content Flag | True |

| Service ID | Service Name | Public Key |
|---|---|---|
| S1 | Today's News | 7uBJ8jbjUjBikj... |
| S2 | Useful Information | IInn;pplhbnOI... |
| S3 | New Car Guide | INopdokIOlpOp... |

Ispc

Cbc = C(S1, Bsgn)

| Item | Value |
|---|---|
| Service ID | S1 |
| Content ID | 101 |
| Content Version | 2.10 |
| Content Name | Browser Content for Today's News |
| Browser Content Flag | True |
| Signature | AegrawedfaaewQW... |

Isps

| Service ID | Service Name |
|---|---|
| S 1 | Today's News |
| S 2 | Useful Information |
| S 3 | New Car Guide |

CSD

| Content ID Range | Type | Service ID |
|---|---|---|
| 0 ~ 99 | Browser Content | – |
| 100 ~ 199 | Service Content | S 1 |
| 200 ~ 299 | Service Content | S 2 |
| 300 ~ 399 | Service Content | S 3 |

Cbs = C(S1, Brng)

| Item | Value |
|---|---|
| Service ID | S1 |
| Content ID | 001 |
| Content Version | 2.10 |
| Content Name | Browser Content For Today's News |

Fig. 25  Prior Art
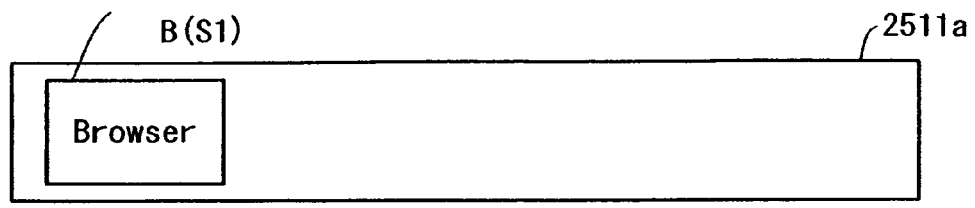
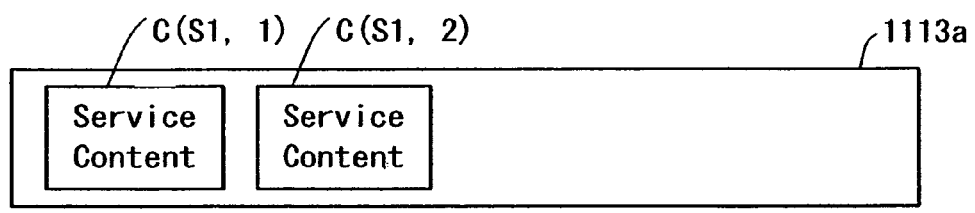
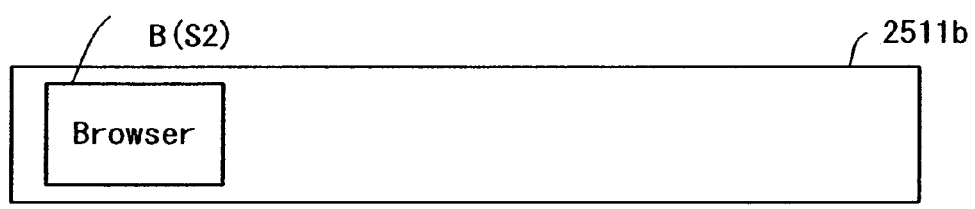
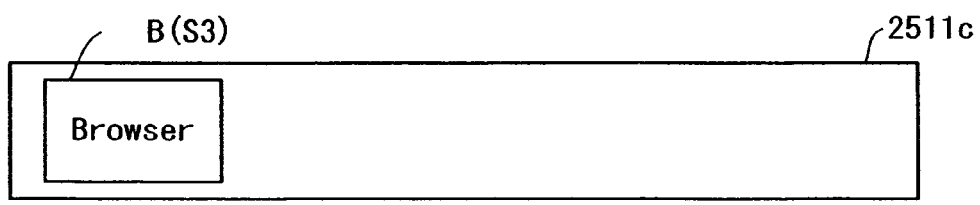
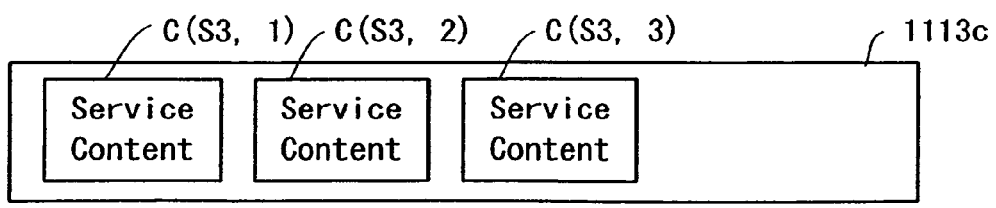

CONTROL CONTENT TRANSMISSION METHOD AND STORAGE-BASED BROADCASTING SYSTEM

BACKGROUND OF THE INVENTION

1. Field of the Invention

The present invention relates to information service systems for automatically providing a user with a presenter which is required for viewing desired contents with a viewer regardless of the presence or absence of a user's request and, more specifically, to a storage-based broadcasting system that automatically updates the viewer.

2. Description of the Background Art

Information service systems for providing users with a service for viewing contents require a browser for supplying the content data to a presenter in order to make the content data available to the user. This browser must be appropriately updated depending on factors attributed to the content data to be provided, a transmission channel used for providing the content data to the user, and the presenter on the user's side.

As one example of conventional information service systems, a push-type information distribution service using a computer over the Internet has been realized by, for example, PointCast Network (registered trademark) of PointCast Incorporated, and Active Desktop (registered trademark) of Microsoft Corporation.

In such a push-type information distribution service, contents such as news and weather forecast that are broadcast from a broadcast station over the Internet are received by and stored in a receiver such as a personal computer. A user operates the receiver to activate a browser, which is a user interface for viewing contents. Thus, the user can view the contents stored in the receiver.

Different browsers are used for different services. Consequently, a flexible user interface can be achieved for each service. If the browser needs to be updated, the user receives a new browser by using a function programmed directly on the current browser itself. Then, the current browser is replaced with the received new browser. In this way, the browser can be updated.

With reference to FIGS. 24, 25, 26, 27, 28, 29, and 30, one example of the conventional broadcasting system is now described. As shown in a block diagram of FIG. 24, a broadcasting system 2500 includes a transmitting apparatus 2510, a delivery system 120, and a receiving apparatus 2520. The transmitting apparatus 2510 includes browser storages 2511, browser pitchers 2513, content storages 1113, content pitchers 2514, a multiplexer 115, and a transmitter 116.

There are two or more browser storages 2511, browser pitchers 2513, content storages 1113, and content pitchers 2514 provided. Each of these components is given a symbol with a suffix (lower-case alphabet) added thereto. Hereinafter, the same components are each given the same symbol with a different suffix added thereto for identification.

In the example of FIG. 24, three browser storages 2511 are provided: browser storages 2511a, 2511b, and 2511c; three browser pitchers 2513 are provided: browser pitchers 2513a, 2513b, and 2513c; three content storages 1113 are provided: contents storages 1113a, 1113b, and 1113c; and three content pitchers 2514 are provided: content pitchers 2514a, 2514b, and 2514c. Note that, if each of the same components needs not be specifically identified, they are generally referred to as the browser storages 2511, the browser pitchers 2513, the content storages 1113, and the content pitchers 2514, respectively.

In this specification, if there are a plurality of the same components as described above, they are identified by adding a suffix to each symbol. Furthermore, if each of the plurality of components does not need to be specifically identified, the components are generally referred to without a suffix added to the symbol.

In FIGS. 25, 26, 27 and 28, data stored in the browser storages 2511, the content storages 1113, the storage 133, and the memory 138 in the above broadcasting system 2500 are shown. The three browser storages 2511a, 2511b, and 2511c are independently and respectively provided for three services (S1, S2, and S3). The browser pitchers 2513 each store a browser B that corresponds to a service (S) to be provided to a user, and the browser pitchers 2513 send the browser B to the multiplexer 115 according to a predetermined schedule.

The browser pitcher 2513a for the service S1 stores a browser B(S1). The browser B is a computer program written in native code (machine language) of a CPU (Central Processing Unit) in the receiving apparatus 2520. Similarly, the browser pitcher 2513b for the service S2 stores a browser B(S2), and the browser pitcher 2513c for the service S3 stores a browser B(S3). Note that if each of the browsers does not need to be specifically identified, the browsers are simply referred to as the browser B.

A specific browser transmission technique such as a communication protocol and transmission schedule is defined for each service. Thus, processes carried out by the browser pitchers 2513 vary among the services. For this reason, the browser pitchers 2513a, 2513b, ..., 2513n (n is an arbitrary natural number) are independently and respectively provided for the services.

In the example shown in FIG. 24, the three browser pitchers 2513a, 2513b, and 2513c are independently provided for the three services S1, S2, and S3, respectively. The content storage 1113 stores a content C of the corresponding service. The content storage 1113 is provided for each service. In FIG. 25, the three content storages 1113a, 1113b, and 1113c are independently provided for the three services, respectively.

In the example shown in FIG. 25, the content storage 1113a for the service S1 stores two service contents C(S1, 1) and C(S1, 2). The content storage 1113b for the service S2 does not store any content C. The content storage 1113c for the service S3 stores three service contents C(S3, 1), C(S3, 2), and C(S3, 3). Note that if each of the contents does not need to be specifically identified, the content is simply referred to as the service content C.

Referring back to FIG. 24, the content pitcher 2514 sends the content C(Sm, O) stored in the content storage 1113 of the corresponding service to the multiplexer 115 in a predetermined manner. In the content C(Sm, O), Sm represents a service S with a suffix m (m is an arbitrary natural number) for identification, and O (O is an arbitrary natural number) represents an ordinal number of a plurality of contents C that form the service Sm.

As such, in the transmitting apparatus 2510 used for the conventional broadcasting system 2500, methods for transmitting browsers and contents vary among services. Therefore, the plurality of browser pitchers 2513 and content pitchers 2514 have to be individually provided for each of the services. Moreover, different transmission methods should be respectively prepared for the browser B and the content C. Therefore, the plurality of pitchers have to be individually provided for the browser B and the content C.

The multiplexer 115 multiplexes and modulates the browser B received from the browser pitcher 2513 and the service content C (Sm, O) received from the content pitcher 2514 to output a digital bit stream. The multiplexer 115 may be structured by a multiplexer and a modulator in a station system for digital broadcasting.

The transmitter 116 receives data processed by the multiplexer 115 and sends the received data to the delivery system 120. The transmitter 116 may be implemented by a modem if the delivery system 120 is structured by a wired communications circuit, or the transmitter 116 may be implemented by a parabolic antenna for transmission if the delivery system 120 is structured by a broadcasting communications satellite in space.

The delivery system 120 is now described. The delivery system 120 is a means for transmitting information, such as contents and browsers sent from the transmitting apparatus 2510, to the receiving apparatus 2520. For example, the delivery system 120 may be structured by an optical fiber or cables of various types, such as a broadcasting communications satellite in space, or a package medium such as a DVD and its distribution channels.

The receiving apparatus 2520 is now described in detail. The receiving apparatus 2520 includes a receiver 131, a de-multiplexer 132, a storage 133, a renderer 134, a presenter 135, an input device 136, a CPU 137, and a memory 138.

The receiver 131 receives information such as the content C and the browser B through the delivery system 120 and outputs a digital bit stream. The receiver 131 may be implemented by a modem, or a module including an antenna and a tuner that are used in general digital broadcasting receivers.

The de-multiplexer 132 demodulates the digital bit stream received from the receiver 131, and separates the multiplexed information. That is, the de-multiplexer 132 carries out the process carried out by the multiplexer 115 of the transmitting apparatus 2510 in the reverse direction. An output from the de-multiplexer 132 is provided to the storage 133 and can be read by the CPU 137.

The storage 133 stores the browsers and contents provided by the de-multiplexer 132. The storage 133 is implemented by, for example, a randomly-accessible recording medium such as a hard disk. Information stored in the storage 133 is readable and changeable by the CPU 137.

As illustrated in FIG. 26, the storage 133 stores the three browsers B(S1), B(S2), and B(S3), and five contents C(S1, 1), C(S1, 2), C(S3, 1), C(S3, 2), and C(S3, 3).

The renderer 134, by following an instruction from the CPU 137, renders graphics for displaying an on-screen display (OSD) on a screen.

The presenter 135 presents an output of the renderer 134 in a form which is viewable by the user. The presenter 135 may be implemented by a CRT display, for example.

The input device 136 is operated by the user to instruct the receiving apparatus 2520. The input device 136 may be implemented by a combination of a remote controller and its photoreceptor, a keyboard, a mouse, or others.

The CPU 137, which is a central processing unit, is interconnected to each component of the receiving apparatus 2520. By executing a computer program stored in the memory 138, the CPU 137 controls the entire receiving apparatus 2520.

The memory 138 is constructed of a writable/unwritable semiconductor memory RAM/ROM. The memory 138 is used for storing data processed by the CPU 137 and for storing a computer program and data to be executed in the CPU 137. As illustrated in FIG. 27, the memory 138 stores a browser list 2700, and a computer program 2651 written in native code (machine language) which is executable by the CPU 137.

With reference to FIG. 28, the browser list 2700 is now described. The browser list 2700 indicates information in a tabular form with rows for the services. The browser list 2700 includes a column 2710 for browser file names and a column 2720 for service names. With the use of the browser list 2700, the browser can be specified for a desired service from among information stored in the storage 133.

With reference to a flow chart in FIG. 29, the main operation of the receiving apparatus 2520 is now described in detail.

In step S2801, all service names (2720) of the browser list 2700 stored in the memory 138 are displayed on the screen in list form. Such screen display is carried out by the renderer 134.

In step S2802, the user operates the input device 136 to select one of the services in the list displayed in step S2801.

In step S2803, for the service selected in step S2802, the file name B(Sm) stored in the storage 133 is obtained by referring to the browser-file-name column in the browser list 2700.

In step S2804, the file B(Sm) specified in step S2803 is executed. The browser is written in native code of the CPU 137, and therefore can be executed directly by the CPU 137.

With reference to a flow chart in FIG. 30, a browser updating process by the receiving apparatus 2520 is now described.

In step S2901, the CPU 137 starts executing the currently-transmitted browser B.

In step S2902, the browser B is received by the receiver 131 and then the de-multiplexer 132, and the version of the browser B is checked.

In step S2903, if the browser B received in step S2902 is a new version of the currently-executed browser B, the procedure goes to a next step S2904, and if not, the procedure ends.

In step S2904, the receiving apparatus 2520 receives the currently-transmitted browser B, and the storage 133 temporarily stores the received browser B as a file.

In step S2905, the currently-executed browser B is replaced with the temporarily-stored file. Then, by rebooting the browser B, the received browser of the new version starts to be executed.

In the above example of the conventional broadcasting system, the browser written in native code of the computer is transmitted by using a method unique to each service. Therefore, various browser transmission methods specific to services have to be incorporated in both transmitting and receiving apparatuses.

That is, in the transmitting apparatus, various browser pitchers specific to services are required. In the receiving apparatus, a function is programmed, typically in the browser code for each service, for receiving a new browser for a new service and replacing the existing browser with the received new browser.

To realize substantially the same function for each service, the browsers each should be implemented in a slightly different specification.

Therefore, as the number of services increases, various needlessness occurs. That is, in the receiving apparatus, a plurality of similar program codes have to be held, thereby wasting the storage capacity. Also, similar processes are simultaneously activated in the receiving apparatus, and therefore computer resources cannot be efficiently used.

Furthermore, browser transmission methods vary among the services, and are programmed only in the browsers. Therefore, the user suffers the inconvenience of manually obtaining the browser in advance by activating a file communications protocol such as ftp.

Still further, there are various differences between the browser and the content in the transmission method. Therefore, in a case where a plurality of services are subscribed, transmission of one service may interfere with transmission of another browser or service.

Also in the transmitting apparatus, slightly different browser pitchers are required for as many as the services in order to achieve browser transmission, which is essentially the same function to any service. Therefore, the transmitting apparatus becomes more linearly complicated in structure as the number of services increases. This complicated structure causes an increase in the development cost and an inconvenience in management.

Furthermore, these browser pitchers have no relation to one another. These browser pitchers may transmit browsers more than the delivery system can handle, thereby causing an overflow. The content pitchers are also independent of one another for each service, and therefore the same problem may occur.

SUMMARY OF THE INVENTION

An object of the present invention is to provide a method and system for providing a flexible user interface for services in storage-based broadcasting in which a service is structured by a plurality of contents transmitted in digital broadcasting or a computer network, while also securing services from invalid or unauthorized contents.

The present invention has the following features to solve the problem described above.

A first aspect of the present invention is directed to a storage-based broadcasting system that supplies a user interface which is unique to a service composed of a content stored therein for presenting the service, the system comprising:
 a transmission unit for transmitting a control content for realizing the user interface as the entire content or part of the content; and
 a receiving unit for receiving and activating the transmitted control content in order to execute the user interface, wherein
 the user interface is transmitted and received as a content.
 According to a second aspect, in accordance with the first aspect,
 the control content is a browser for the stored content.
 According to a third aspect, in accordance with the first aspect,
 the transmitting apparatus comprises:
 content pitcher means for pitching the content including the control content; and
 a service property transmitting unit for transmitting service property information indicating the service, where
 the receiving unit comprises a control content determination unit for determining, based on the received content and the service property information, the control content among the received contents.
 According to a fourth aspect, in accordance with the third aspect,
 the content pitcher unit comprises a content assembler unit for adding, to the content, a content header defining the content, and
 the receiving unit further determines the control content among the received contents based on the content header of the received content.
 According to a fifth aspect, in accordance with the third aspect,
 the transmitting unit further comprises an electronic signature unit for placing an electronic signature on the control content, and the service property transmitting unit transmits a public key of the electronic signature as being included in the service property information; and the receiving unit further comprises a signature authentication unit for authenticating the electronic signature by a public key included in the received service property information, and the control content is determined through authentication of the electronic signature.
 According to a sixth aspect, in accordance with the fifth aspect,
 the authentication of the electronic signature is performed using a key unique to the service.
 According to a seventh aspect, in accordance with the third aspect,
 the content pitcher unit further comprises a content ID space management unit for sending information for defining part of ID space of the content, and
 the receiving unit further comprises a designation unit for designating the control content based on the content ID included in the part of an ID space.

An eighth aspect of the present invention is directed to a control content transmission method for use with a storage-based broadcasting system that supplies a user interface which is unique to a service composed of a content stored in the storage-based broadcasting system for presenting the service. The control content transmission method, using the storage-based broadcasting system, provides a user interface which is unique to the service. The control content transmission method comprises:
 a step of transmitting a control content for realizing the user interface as the entire content or part of the content; and
 a step of receiving and activating the transmitted control content so as to execute the user interface.
 According to a ninth aspect, in the eighth aspect,
 the control content is a browser for the stored content.
 According to a tenth aspect, in accordance with the eighth aspect,
 the transmitting step comprises:
 a step of pitching (sending) the content including the control content; and
 a step of transmitting service property information indicating the service, and
 the receiving step comprises a step of determining the control content among the received contents based on the received content and service property information.
 According to an eleventh aspect, in accordance with the tenth aspect, the content pitching (sending) step comprises a step of adding, to the content, a content header defining the content, and
 the receiving step further comprises a step of determining, based on the content header of the received content, the control content among the received contents.
 According to a twelfth aspect, in accordance with the tenth aspect, the transmitting step comprises a step for placing an electronic signature on the control content,
 the service property transmitting step further comprises a step of transmitting a public key of the electronic signature as being included in the service property information, and
 the receiving step further comprises:
 a step of authenticating the electronic signature by the public key included in the received service property information; and
 a step of determining the control content through authentication of the electronic signature.
 According to a thirteenth aspect, in accordance with the twelfth aspect,
 the authentication of the electronic signature is performed using a key unique to the service.
 According to a fourteenth aspect, in accordance with the tenth aspect, the content pitching step further comprises a step of sending information for defining part of an ID space of the content, and the receiving step further comprises a step of determining the control content based on the content ID included in the part of the ID space.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram for explaining service property information stored in a service property storage shown in FIG. 1;

FIG. 3 is a diagram schematically showing one example of a content body stored in a content body storage of FIG. 1;

FIG. 4 is a diagram for assisting in explaining the service property information in the storage-based broadcasting system shown in FIG. 1;

FIG. 5 is a diagram for assisting in explaining a service content in the storage-based broadcasting system shown in FIG. 1;

FIG. 6 is a diagram for assisting in explaining a browser content in the storage-based broadcasting system shown in FIG. 1;

FIG. 25 is a diagram schematically showing one example of contents stored in content storages and browser storages shown in FIG. 24;

DESCRIPTION OF THE PREFERRED EMBODIMENTS

First Embodiment

With reference to FIGS. 1, 2, 3, 4, 5, 6, 7, 8, 9, and 10, a storage-based broadcasting system according to a first embodiment of the present invention is described.

Figure 1:
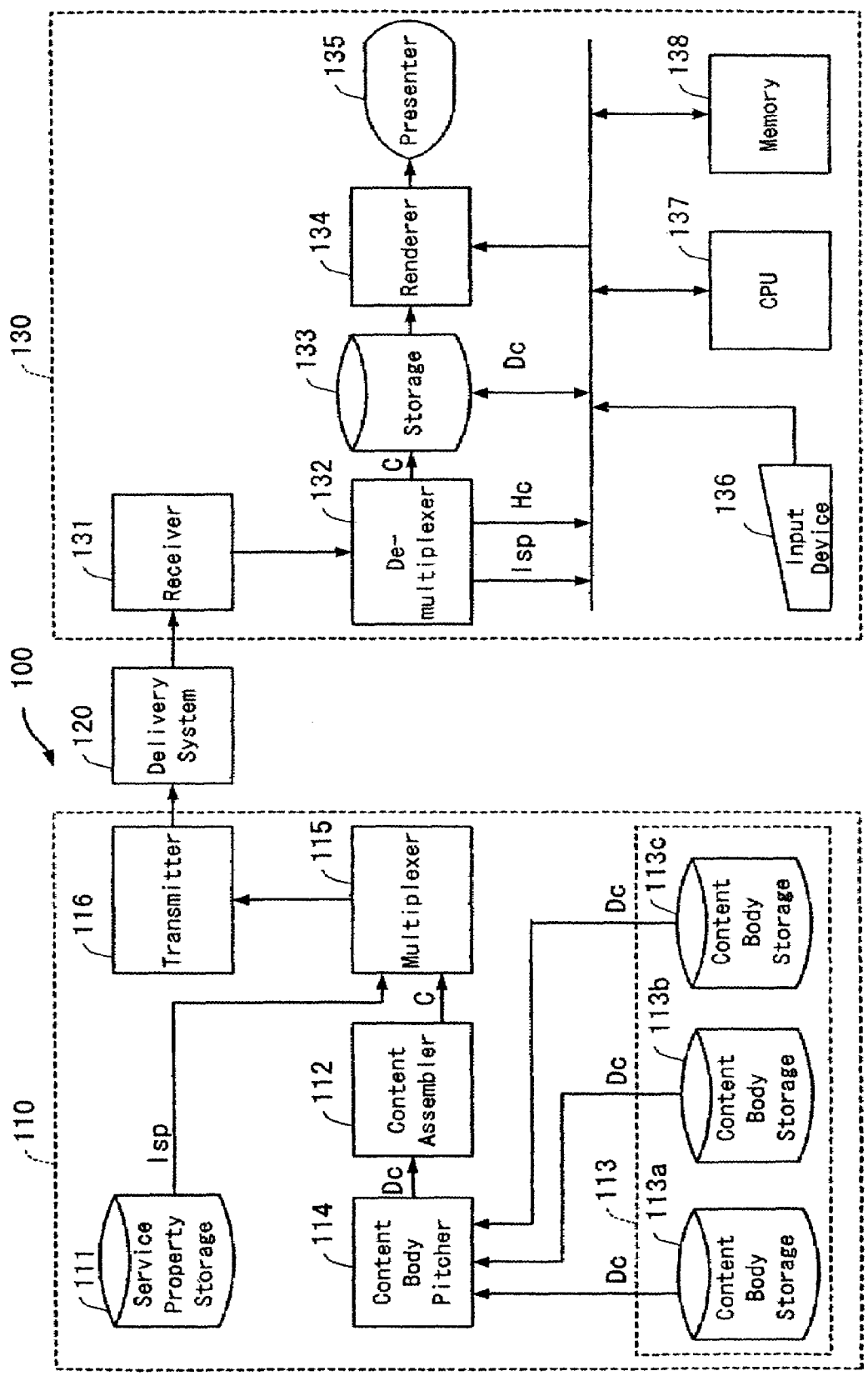
FIG. 1 is a block diagram showing the structure of a storage-based broadcasting system according a first embodiment of the present invention.

As shown in FIG. 1, a storage-based broadcasting system 100 according to the first embodiment of the present invention includes a transmitting apparatus 110, a delivery system 120, and a receiving apparatus 130.

The transmitting apparatus 110 includes a service property storage 111, a content assembler 112, content body storages 113, a content body pitcher 114, a multiplexer 115, and a transmitter 116. There are two or more content body storages 113 provided. Each of these components is given a symbol with a suffix (lower-case alphabet) added thereto for identification. Similarly, hereinafter in the specification, the same components are each given a symbol with a suffix for identification. If each of the same components does not need to be specifically identified, the components are generally referred to with the symbol only and no suffix, such as the content body storages 113.

Each content body storage 113 stores a content body Dc, which is substance data of each service. Each content body storage 113 provides the respective content body Dc to the content body pitcher 114.

The content body pitcher 114 sends, or pitches, the provided content body Dc to the content assembler 112.

The content assembler 112 produces a content header Hc and the like with reference to service property information Isp stored in the service property storage 111. Then, the content assembler 112 assembles the received content body Dc, the content header Hc, and the like into a content C. The content body Dc is composed of management information of the content body Dc including header information to generate a content C. This generated, or assembled, content C is provided to the multiplexer 115.

The multiplexer 115 multiplexes the service property information Isp received from the service property storage 111 and the content C received from the content assembler 112. The multiplexer 115 then provides the multiplexed information to the transmitter 116.

The transmitter 116 modulates the multiplexed service property information Isp and the content C into a digital bit stream in a form suitable to the delivery system, and then outputs the modulated information to the delivery system 120. The transmitter 116 may be implemented by a modem if the delivery system 120 is structured by a wired communications circuit, or the transmitter 116 may be implemented by a parabolic antenna for transmission if the delivery system 120 structured by a broadcasting communications satellite in space.

The delivery system 120 is a means for transmitting information such as a content C and a browser B sent from the transmitting apparatus 110 to the receiving apparatus 130. For example, the delivery system 120 may be structured by an optical fiber or cables of various types, a broadcasting communications satellite in space, or a package medium such as a DVD and its distribution channels.

The receiving apparatus 130 includes a receiver 131, a de-multiplexer 132, a storage 133, a renderer 134, a presenter 135, an input device 136, a CPU 137, and a memory 138. Note that the storage 133, the renderer 134, the input device 136, the CPU 137, and the memory 138 are connected to one another through a data bus.

The receiver 131 receives the content C and the browser B through the delivery system 120, and outputs a digital bit stream. The receiver 131 may be implemented by a communications modem, a cable modem, a mobile communications module such as Bluetooth, or a module including an antenna and a tuner that are used in general digital broadcasting receivers.

The de-multiplexer 132 demodulates the digital bit stream received from the receiver 131, and separates the multiplexed information. That is, the de-multiplexer 132 carries out the process carried out by the multiplexer 115 of the transmitting apparatus 110 in the reverse direction. An output from the de-multiplexer 132 is provided to the storage 133 and can be read by the CPU 137.

The storage 133 is, for example, a randomly-accessible recording medium such as a hard disk, and readable and changeable by the CPU 137. The storage 133 stores a service content C(Sm, O) and a browser content C(Sm, Bflg) received from the de-multiplexer 132. The service content C(Sm, O) is a service substance such as a broadcast program or data provided by the storage-based broadcasting system 100 and is viewed with enjoyment or used by users. The browser content C(Sm, Bflg) realizes a user interface for the user to enjoy and use the provided service on the receiving apparatus 130. The browser content C(Sm, Bflg) is control code executable under a program code execution environment provided by the receiving apparatus 130, and targets the service content C(Sm, O) for processing.

The renderer 134, by following an instruction from the CPU 137, renders graphics for displaying on-screen display (OSD) on a screen.

The presenter 135 presents an output of the renderer 134 in a form which is viewable by the user. The presenter 135 may be implemented by a CRT display, for example.

The input device 136 is operated by the user to instruct the receiving apparatus 130. The input device 136 may be implemented by a combination of a remote controller and its photoreceptor, a keyboard, a mouse, or other components.

The CPU 137, which is a central processing unit, is interconnected to each component of the receiving apparatus 130. By executing a computer program stored in the memory 138, the CPU 137 controls the entire receiving apparatus 130.

The memory 138 is constructed of a writable/unwritable semiconductor memory RAM/ROM. The memory 138 is used for storing data processed by the CPU 137 and for storing a computer program and data to be executed by the CPU 137.

In FIGS. 2, 3, 4 and 5, the states of data stored in each component of the storage-based broadcasting system 100 are shown.

As shown in FIG. 2, the service property storage 111 is provided for storing the service property information Isp which indicates a property of each service to be provided by the storage-based broadcasting system 100.

As shown in FIG. 3, the content body storage 113 stores a content body Dc, which is a substance of the content C composing each corresponding service. The content body storage 113 is provided for each service. That is, three content body storages 113a, 113b, and 113c are independently provided for three difference services, respectively. The content body storage 113a corresponds to a service S1, and stores two content bodies Dc(S1, 1) and Dc(S1, 2) and one browser content body Dc(S1, Bflg). An arbitrary content body Dc is hereinafter represented as a content body Dc(Sm, O), where a symbol S with a suffix m (m is an arbitrary natural number) indicates each service for identification, and a parameter O (O is an arbitrary natural number) indicates an ordinal position of the content body in the contents C that compose a service Sm. The browser content body Dc(S1, Bflg) is generated from a browser B(S1) for the service S1 in the same format as the content body Dc, and can be generally referred to as a browser content body Dc(Sm, Bflg), like the service content body Dc(Sm, O).

On the other hand, unlike the service content body Dc(Sm, O), the browser content body Dc(Sm, Bflg) includes a parameter Bflg indicating the service property information Isp, instead of the parameter O. The service property information Isp will be described later referring to FIG. 4. However, the browser content body Dc(Sm, Bflg) are the same in data format as the service content body Dc(Sm, O). Therefore, the content body storage 113 cannot discriminate therebetween, and the content body storage 113 handles both as the content body Dc. In this meaning, the browser content body Dc(Sm, Bflg) and the service content body Dc(Sm, O) are collectively referred to as the content body Dc.

Hereinafter, for simplification, the service content body Dc(Sm, O) is abbreviated as a service content body DcS, and the browser content body Dc(Sm, Bflg) is as a browser content body DcB, as required. Furthermore, the browser content C(Sm, Bflg) composed of the browser content body Dc(Sm, Bflg) is abbreviated as a browser content Cb, and the service content C(Sm, O) composed of the service content body Dc(Sm, O) is abbreviated as a service content Cs.

With reference to FIGS. 4, 5, and 6, the service content Cs and the browser content Cb outputted from the content assembler 112 are described in detail. In FIG. 4, the service property information Isp stored in the service property storage 111 is exemplarily shown. The service property information Isp relates to all services (S1, S2, S3, . . . , Sm) to be provided by the storage-based broadcasting system 100. In a table shown in FIG. 4, each row corresponds to each service, and is composed of a service ID and service name.

For example, in the first row, a service with its service ID "S1" and service name "Today's News" is shown. Similarly, a service with its service ID "S2" and service name "Useful Information" is shown in the second row, and a service with its service ID "S3" and service name "New Car Guide" is shown in the third row. The service ID is unique to each service in the service property information Isp, and can be used for identifying each service.

In FIG. 5, the data structure of the service content Cs is schematically shown. In FIG. 6, the data structure of the browser content Cb is schematically shown. The content C is structured of the content body Dc, which is data of the content C itself, and the content header Hc, which is meta data accompanying the content body Dc.

In FIG. 5, the service content body DcS of the content C(S1, 1) of the service content Cs is related to the content header HcS. In FIG. 6, the browser content body DcB of the content C(S1, Bflg) of the browser content Cb is related to the content header HcB.

The content header Hc (HcS and HcB) are represented in tabular form taking a set of an item and a value as one row. The content header HcS includes four rows: the service ID, content ID, content version, and content name.

The service ID corresponds to the service ID of the service property information Isp illustrated in FIG. 4. The service ID identifies the service S to which the content C corresponds. In the present example, the service ID is "S1", and therefore service ID S1 indicates that the content C is the service "Today's News" as shown in FIG. 4.

The content ID is used for identifying the content C itself. Thus, each content ID takes a unique value in the storage-based broadcasting system 100.

The content version is provided for indicating whether the version of the content C is older or newer when compared with other content C. Each content ID has a value of the content version independently of one another. When the content Cc currently stored in the storage 133 (as will be described later with reference to FIG. 7) is replaced with the new content Cn for update, a content version larger in number than the current content Cc is provided to the new content Cn.

The content name is an item for the user to select as a character string. In the present example, the content name indicates that the content body Dc is "Weather Forecast".

The above-stated service ID, content ID, content version, and content name are included in both of the service content header HcS and the browser content header HcB.

However, as shown in FIG. 6, the browser content header HcB of the browser content Cb further includes a row indicating a browser content flag.

The browser content flag is an item for indicating that the content C is the browser content Cb, and is equivalent to Bflg as stated above. The browser content flag in the browser content header HcB is True, thereby indicating that the content body Dc is the browser content body DcB.

In the browser content Cb as shown in FIG. 6, the service ID is "S1", and the content ID is "101". That indicates that the browser content Cb for the service "Today's News" is composed of the content body Dc with the content ID "101". In other words, at least three items, that is, the service ID, content ID, and browser content flag, are required to define the content C as the browser content Cb.

The process carried out by the service property storage 111, the content assembler 112, the content body storages 113, and the content body pitcher 114 is described below based on the data structure of the content C as described above.

The content body pitcher 114 sends, or pitches, the content bodies Dc successively and repeatedly provided by the content body storages 113 to the content assembler 112. The content assembler 112 adds a content header (HcS, HcB) to the content body Dc (DcS, DcB) so as to generate the content C (Cs, Cb) for output to the multiplexer 115.

Figure 7:
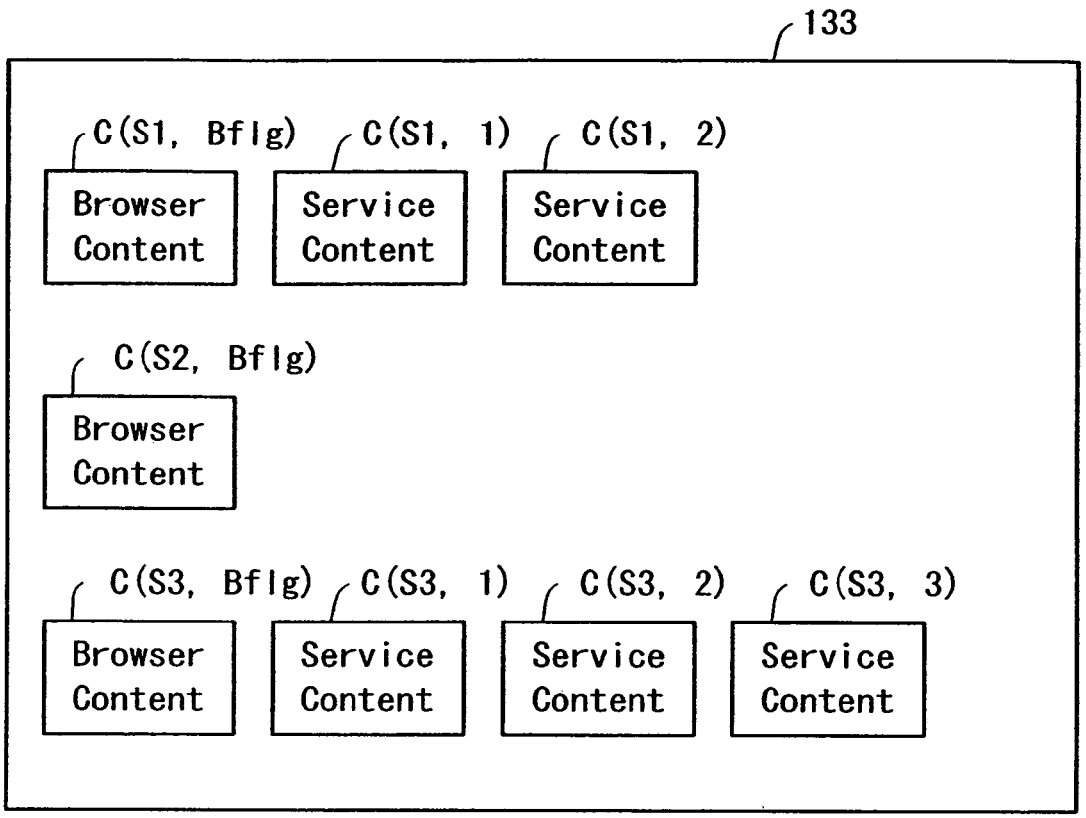
FIG. 7 is a diagram schematically showing one example of contents stored in a storage shown in FIG. 1.
Figure 8:
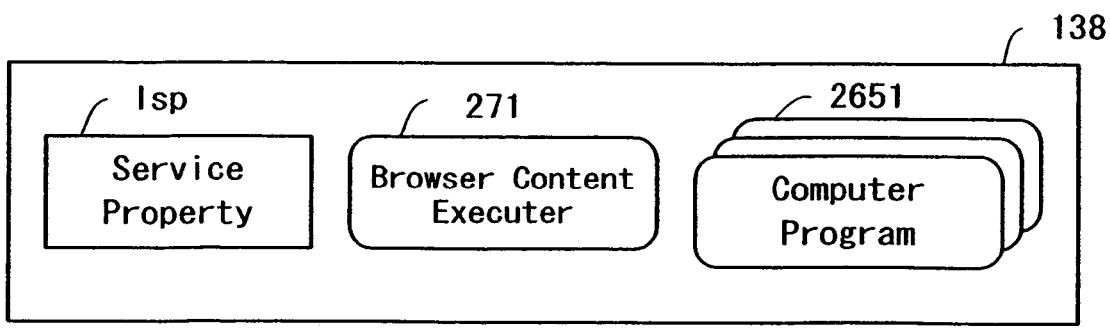
FIG. 8 is a diagram schematically showing information stored in a memory shown in FIG. 1.

With reference to FIGS. 7 and 8, description is now made of the data form in which the content C (service content Cs, browser content Cb) transmitted from the transmitting apparatus 110 through the delivery system 120 is stored in each component of the receiving apparatus 130.

The transmitting apparatus 110 sends to the delivery system 120 a digital bit stream composed of the content C and the service property information Isp. The digital bit stream is first received by the receiver 131 of the receiving apparatus 130, and then is provided to the de-multiplexer 132.

The de-multiplexer 132 demodulates the digital bit stream into the content C and the service property information Isp for reproduction. The de-multiplexer 132 further extracts the content header Hc from the reproduced content C, and outputs the extracted content header Hc and the service property information Isp to the bus.

On the other hand, the reproduced content C is temporarily held in the de-multiplexer 132. For discriminating between the reproduced content C and the content C already stored in the storage 133, the former is hereinafter referred to as a demodulated content Cn, and the latter is referred to as a stored content Cc.

The storage 133 receives, in predetermined timing, the content C reproduced by the de-multiplexer 132, and stores the received content C therein. As shown in FIG. 7, the contents C (Cs, Cb) for the services outputted from the content assembler 112 to the multiplexer 115 are stored in the storage 133.

That is, eight contents, which are produced of eight content bodies in the content body storages 113a, 113b and 113c, are stored in the storage 133. Specifically speaking, the following contents are stored in the storage 133: the content C(S1, Bflg), which is produced of the content body Dc(S1, Bflg); the content C(S1, 1), which is produced of the content body Dc(S1, 1); the content C(S1, 2), which is produced of the content body Dc(S1, 2); the content C(S2, Bflg), which is produced of the content body Dc(S2, Bflg); the content C(S3, Bflg), which is produced of the content body Dc(S3, Bflg), the content C(S3, 1) of the content body Dc(S3, 1), the content C(S3, 2) of the content body Dc(S3, 2); and the content C(S3, 3), which is produced of the content body Dc(S3, 3).

The storage 133 also sends various data, typified by the content body Dc included in the stored content C, to the bus and the renderer 134 under the control of the CPU 137.

The renderer 134 generates, based on the received information, a video signal for rendering an image on the presenter 135.

As shown in FIG. 8, the memory 138 stores the service property information Isp, a browser content executer 271, and a computer program 2651, which is native code for the CPU 137. The browser content executer 271 is to execute the content as a high-level language computer program.

Figure 9:
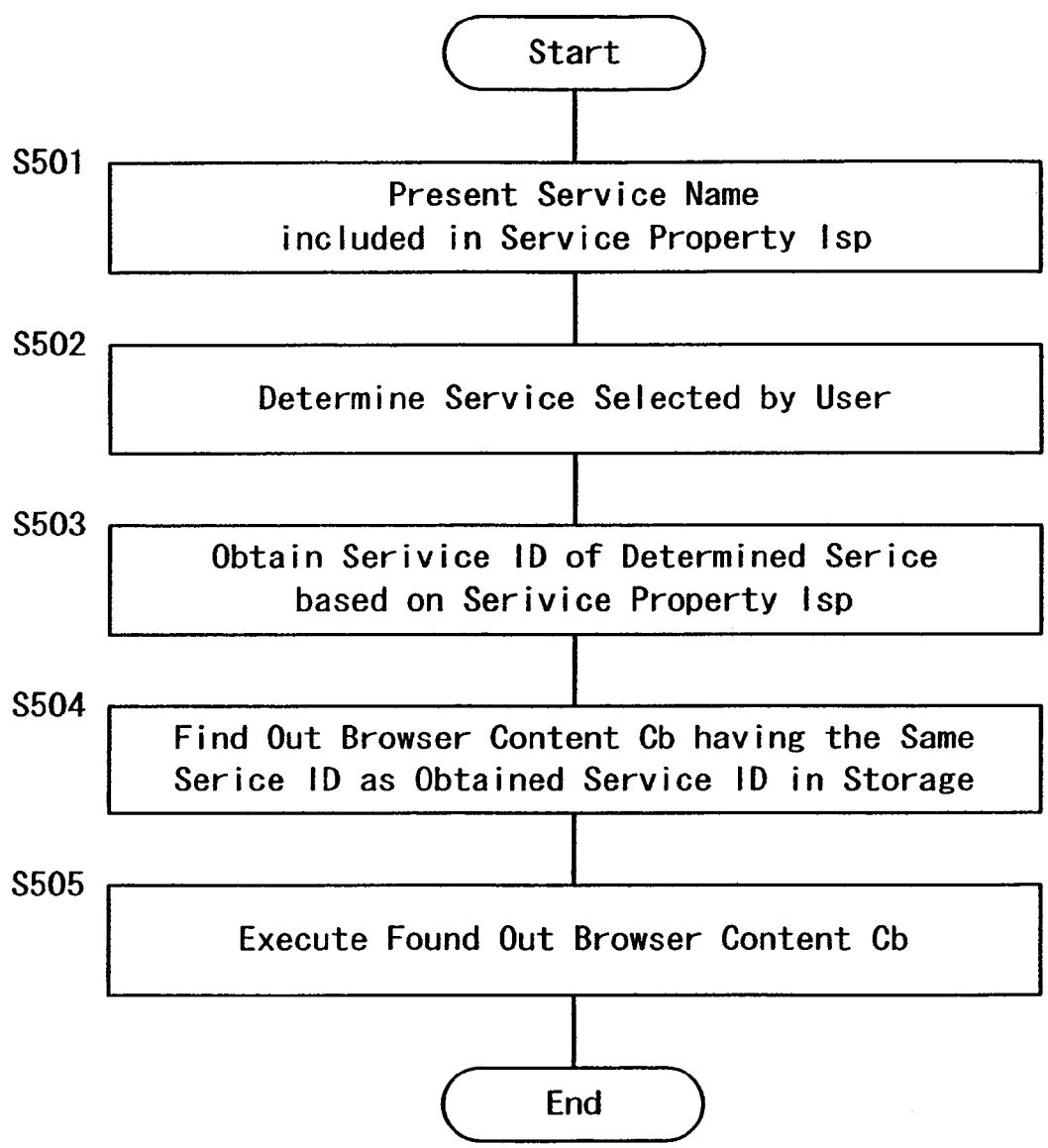
FIG. 9 is a flow chart showing the operation to execute the browser content by a receiving apparatus shown in FIG. 1.

With reference to a flow chart shown in FIG. 9, the operation of activating the browser content Cb included in the content C received by the receiving apparatus 130 is described.

In step S501, the service names of the services described in the service property information Isp outputted from the de-multiplexer 132 are presented in list form on a display of the presenter 135.

In step S502, the user operates the input device 136 to select one of the services by referring to the service name list displayed in step S501. Based on the selection by the user through the input device 136 and the service name list, the service selected by the user is determined.

In step S503, the service ID that corresponds to the service determined in step S502 is obtained based on the service property information Isp.

In step S504, the browser content Cb having the same service ID as that obtained in step S503 and whose browser content flag is True is searched for from among all of the contents C stored in the storage 133.

In step S505, the browser content Cb found in step S504 is provided to the browser content executer 271 for execution.

As such, the browser content flag is provided to the content header HcB of the browser content Cb. With the browser content flag, the browser content Cb and other service content Cs can be discriminated. Furthermore, once each service S is specified, the browser content Cb (C(Sm, Bflg)) corresponding thereto can be activated as a browser.

Figure 10:
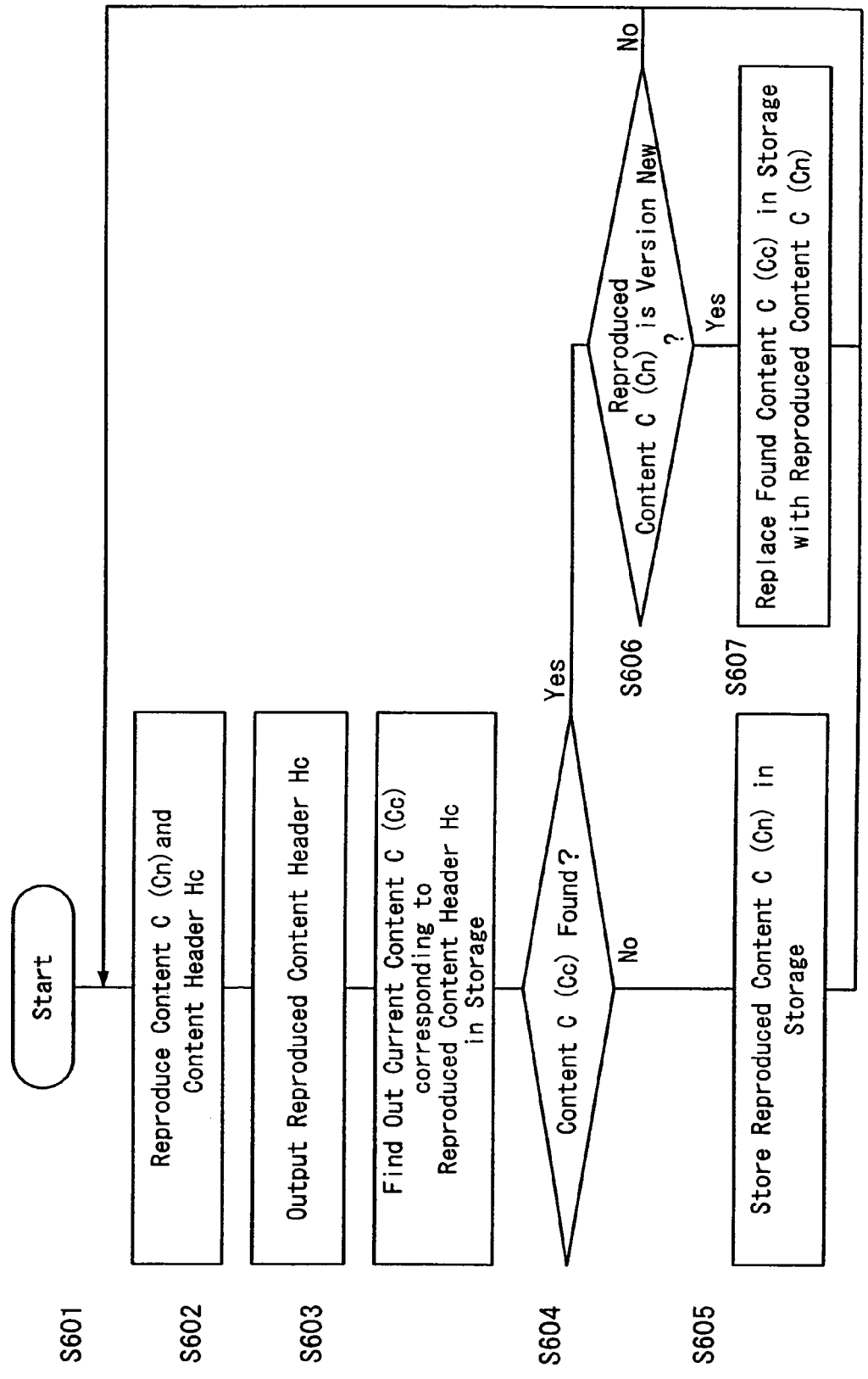
FIG. 10 is a flow chart showing the operation to update the browser content by the receiving apparatus shown in FIG. 1.

With reference to a flow chart shown in FIG. 10, the operation of storing and updating the content by the receiving apparatus 130 is now described.

In step S601, the demodulated content Cn (Cb, Cs), the service property information Isp, and the content header Hc (HcB, HcS) are reproduced by the de-multiplexer 132.

In step S602, the content header Hc reproduced in step S601 is outputted to the bus.

In step S603, the storage 133 is searched for so as to select the current content Cc that corresponds to the reproduced content header Hc for selection. That is, among all contents C stored in the storage 133, the current content Cc having the same content ID as that described in the reproduced content header Hc is selected.

In step S604, if it is determined in step S603 that there is no such current content Cc having the same content ID in the storage 133, the procedure goes to step S605.

In step S605, the demodulated new content Cn is outputted to the storage 133, and is newly stored therein. The procedure then returns to step S601.

On the other hand, in step S604, if it is determined in step S603 that there is any current content Cc having the same content ID in the storage 133, the procedure goes to step S606.

In step S606, based on the reproduced content header Hc, the new content Cn held in the de-multiplexer 132 is compared, in content version, with the current content Cc found in step S603. If the demodulated new content Cn is newer than the current content Cc, the procedure goes to step S607.

In step S607, the current content Cc stored in the storage 133 is replaced with the demodulated new content Cn held in the de-multiplexer 132. With this replacement, the current content Cc is updated to the demodulated new content Cn. At the time when the update is completed, the demodulated new content Cn is dealt with as "current content Cc". Then, the procedure returns to step S601.

On the other hand, if it is determined in step S606 that the demodulated new content Cn is not newer than the current content Cc stored in the storage 133, the step of updating the content C (step S601) is skipped, and the procedure returns to step S601.

As described above, in the storage-based broadcasting system 100, the transmitting apparatus 110 sends the browser content Cb for providing a user interface for each service Sm as the whole or part of the contents C composing each service Sm. Then, the receiving apparatus 130 receives the transmitted content C, and activates the browser content Cb included in the received content C to execute the user interface.

The process of updating the content C is carried out irrespectively of the type of the content C, that is, the service content Cs or the browser content Cb. This updating function is not for a specific service, but is common for all services. Therefore, only with this content-updating function being achieved, the service contents Cs and the browser contents Cb for all services can be updated and stored in the receiving apparatus 130.

In other words, in this embodiment, the browser content Cb, which is a user interface with a service, is sent as part of the content. Therefore, an additional function for transmitting the user interface for the service is not required. Also, updating the content also can make the user interface updated.

Second Embodiment

Figure 11:
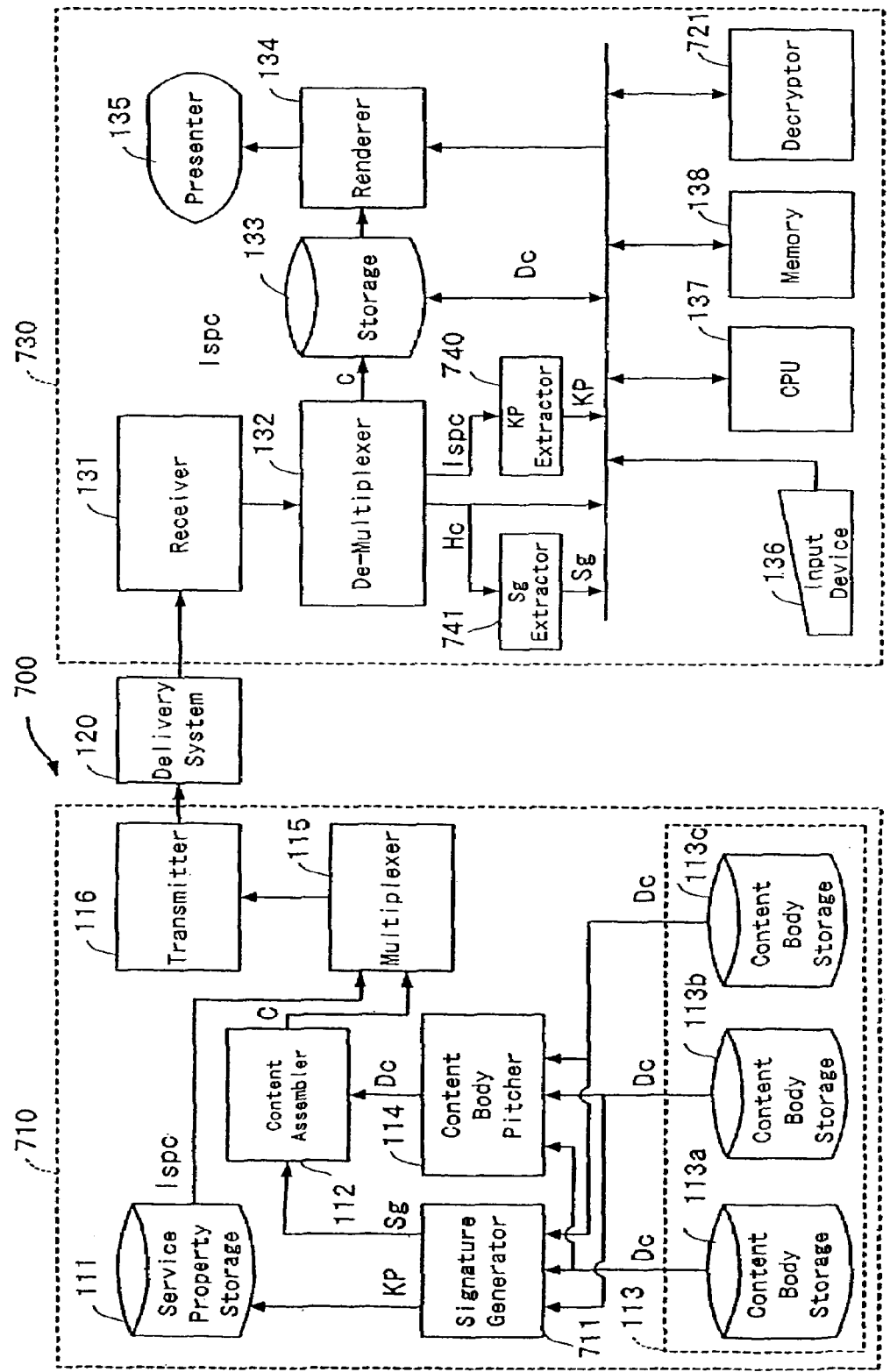
FIG. 11 is a block diagram showing the structure of a storage-based broadcasting system according to a second embodiment of the present invention.

With reference to FIGS. 11, 12, 13, and 14, a storage-based broadcasting system according to a second embodiment of the present invention is described below. As shown in FIG. 11, similar to the storage-based broadcasting system 100 shown in FIG. 1, a storage-based broadcasting system 700 according to the second embodiment includes a transmitting apparatus 710, a delivery system 120, and a receiving apparatus 730.

The transmitting apparatus 710 is the same in structure as the transmitting apparatus 110 of the storage-based broadcasting system 100 of the first embodiment of the present invention, except that a signature generator 711 is added thereto. The receiving apparatus 730 is the same in structure as the receiving apparatus 130 of the first embodiment, except that a KP extractor 740, an Sg extractor 741, and a decryptor 721 are added thereto. Therefore, only the unique features of the storage-based broadcasting system 700 are described below.

The signature generator 711 manages keys for electronic signature and also places an electronic signature (digital signature) to the browser content Cb. For an electronic signature, a public key encryption technique is used. In this technique, a set of a secret key and a public key are generated in an information provider. Only the public key is given to an information user, and the secret key is held secret. Using the given secret key, the information provider places an electronic signature on information to be provided (the information with the electronic signature takes a form of a set of original information and the electronic signature). Using the information with the electronic signature and the public key received from the signature, the user can authenticate that the received information is the one with the electronic signature placed by the information provider having the secret key.

Here, the signature generator 711 holds a secret key and a public key for each service. The signature generator 711 places an electronic signature on the browser content Cb of the service using the secret key for the service. That is, the signature generator 711 is connected to each of the content storages 113a, 113b, and 113c. Based on the services of the content bodies Dc received therefrom, the signature generator 711 outputs a public key KP, which varies among the services, to the service property storage 111.

Figures 12, 13:
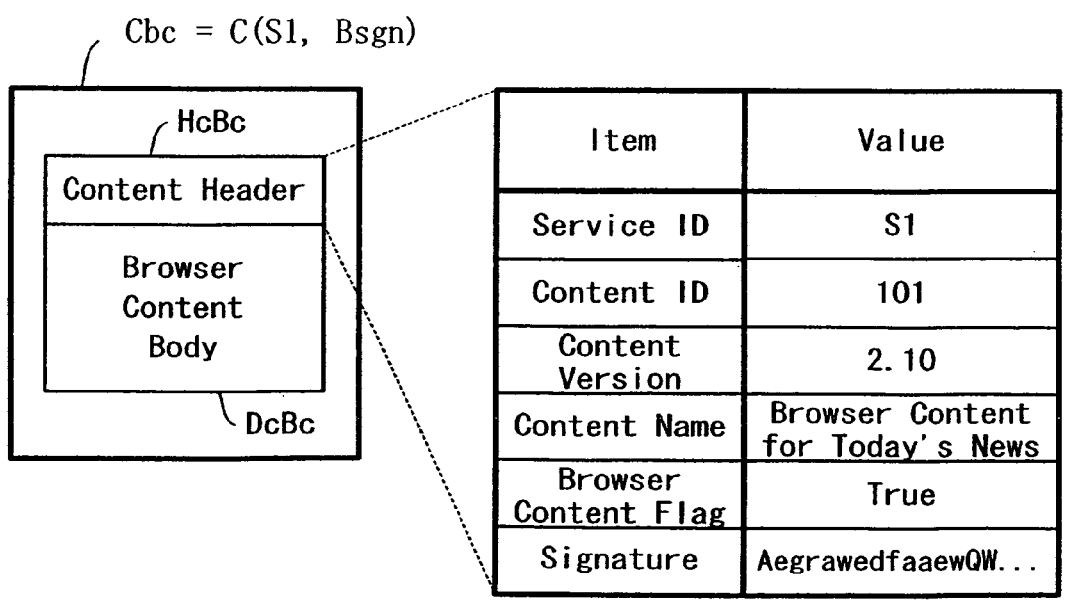
FIG. 12 is a diagram for assisting in explaining service property information in the storage-based broadcasting system shown in FIG. 11.
FIG. 13 is a diagram for assisting in explaining a browser content in the storage-based broadcasting system shown in FIG. 11.
Figure 14:
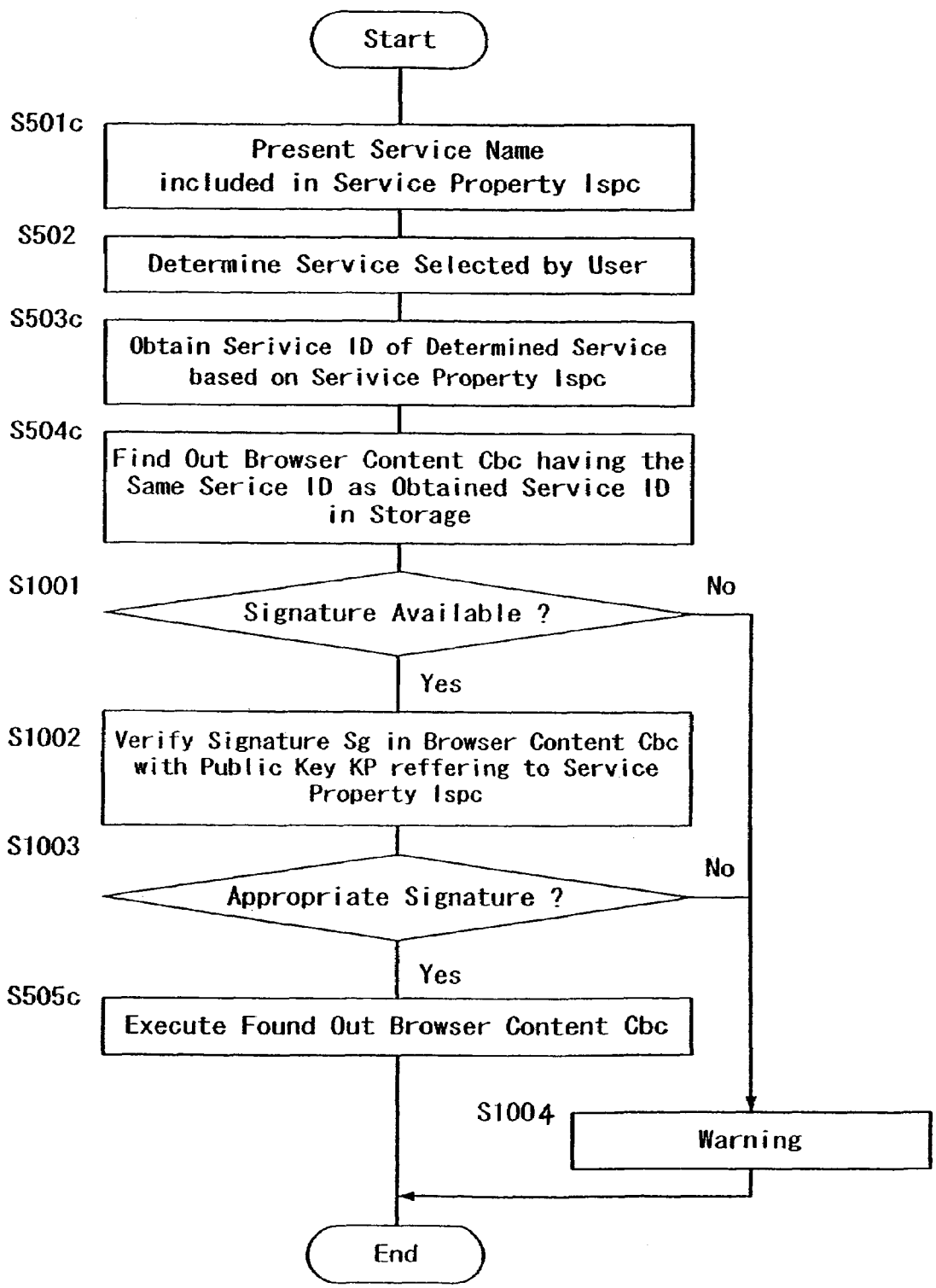
FIG. 14 is a flow chart showing the operation to execute the browser content by a receiving apparatus shown in FIG. 11.

Specifically, as shown in FIG. 13, a signature item is added to the content header HcB of the browser content Cb. Thus, the electronic signature is stored in the browser content Cb. That is, the content header of the browser content Cbc(S1, Bsgn) includes a row for an electronic signature. Stored in the "Value" column corresponding to the "Signature" row is information that resulted from the electronic signature being placed on the corresponding content body Dc with a secret key for the service of the content.

Hereinafter, the content header HcB with the electric signature added thereto is referred to as a content header HcBc. The browser content having the "Signature" item is referred to as a browser content Cbc for discrimination from other browser contents Cb, and is also represented as C(Sm, Bsgn).

The service property storage 111 generates service property information Ispc including the public keys KP, and the service property storage 111 outputs the generated information to the multiplexer 115. In FIG. 12, the structure of the generated service property information Ispc is shown. The service property information Ispc is given a column for storing a value of the public keys KP. One pubic key is stored for each of the services S1, S2, and S3.

The signature generator 711 generates and outputs an electronic signature Sg to the content assembler 112. Based on the content body Dc provided by the content body pitcher 114 and the electronic signature Sg provided by the signature generator 711, the content assembler 112 generates the browser content Cbc with the signature. The content assembler 112 then outputs the browser content Cbc and the service content Cs collectively as the content C to the multiplexer 115.

The receiving apparatus 730 reproduces the content C (Cs and Cbc), the content header Hc (HcS, HcBc), and the service property information Ispc from a digital bit stream received by the de-multiplexer 132. The content C (Cs, HcBc) is held in the de-multiplexer 132. The content header Hc (HcS, HcBc) is outputted to the bus and the Sg extractor 741. The service property information Ispc is outputted to the KP extractor 740.

The Sg extractor 741 extracts the electronic signature Sg from the content header HcBc of the reproduced browser content C(Sm, Bsgn), and outputs the extracted signature Sg to the bus.

The KP extractor 740 extracts the public key KP from the service property information Ispc, and outputs the extracted public key KP to the bus.

The decryptor 721 authenticates the electronic signature in the content header HcBc based on the public key KP provided through the bus.

As stated above, in the receiving apparatus 730, the browser content Cbc can be authenticated by the electronic signature Sg of the received browser content Cbc and the public key KP in the service property information Ispc. In other words, it can be ensured that the browser content Cbc has been encrypted with the secret key unique to the service by a service content creator.

The operation of the receiving apparatus 720 according to the second embodiment is now described. With reference to a flow chart shown in FIG. 14, the process of activating the browser content Cb by the receiving apparatus 730 in the storage-based broadcasting system 700 is described.

Here, the process in steps S501c, S502, S503c and S504 is basically the same as that in steps S501, S502, S503, and S504, respectively in the above-stated receiving apparatus 130, except that the service property information Isp is replaced with the service property information Ispc, and the content C to be processed is replaced with the browser content Cbc. Therefore, description of the same steps in the process is omitted herein.

In step S1001, the "Signature" row of the content header of the extracted browser content Cbc is referred to. If the signature row is not available, that is, if the browser content Cbc with a signature is abnormal, the procedure goes to step S1004.

In step S1004, a warning that the browser content Cbc with signature is abnormal is displayed, and the procedure ends.

On the other hand, if the signature row is available, the procedure goes to step S1002.

In step S1002, it is authenticated whether the electronic signature Sg in the browser content Cbc is placed with the secret key that corresponds to the public key KP. The public key KP for use in this authentication is obtained by selecting the row corresponding to the service from the service property information Ispc.

In step S1003, if it is determined in step S1002 that the electronic signature Sg is not appropriate, the procedure goes to step S1004. On the other hand, in step S1003, if it is determined in step S1003 that the electronic signature Sg is appropriate, the procedure goes to step S505c.

In step S505c, the browser content Cbc with an appropriate electronic signature is executed by the browser content executor. Then, the procedure ends.

In step S1004, a warning that browser content Cb is invalid because it has no signature or erroneous one is given. Then, the procedure ends.

As stated above, in the second embodiment, with the electronic signature technique, only the person who owns the public key to a target service can send the browser content Cb which is executable in the receiving apparatus 720. Therefore, if a person who does not own the public key for the target service stores any content in the content body storage, the erroneous browser content Cb can be prevented from being intentionally sent and executed in the receiving apparatus 730. Moreover, the browser content Cb with an electronic signature with a secret key for another service can be prohibited from being executed as the browser content Cb for the target service.

In the second embodiment, the electronic signature is placed only on the content body. However, the content header may be included in the content body to carry the electronic signature.

Note that a simple electronic signature technique without using public key encryption may be used. For example, one secret key for each service is created, and stored in the receiving apparatus in a predetermined manner. Then, information indicative of the browser content Cb is encrypted with the secret key for each service and decrypted in the receiving apparatus side with the secret key, thereby determining the browser content Cb.

As stated above, in the second embodiment, the signature generator 711 places an electronic signature on the browser content Cbc, which provides a user interface with the service. The content body storages 113 each send the content body Dc including the browser content body DcBc. The service property storage 111 sends the public key KP for the electronic signature Sg as the service property information Ispc for all services in common. The receiving apparatus 730 authenticates the electronic signature Sg to determine that the content C is the browser content Cbc. With these components provided to the storage-based broadcasting system 700, reliability of the content C distributed therein can be ensured.

That is, in the second embodiment, the electronic signature technique is used for designating the browser content Cb among a plurality of contents C composing a single service. The key for use in the electronic signature is provided for each service provider. Thus, the browser content Cb for the service cannot be designated by anyone other than the service provider. Consequently, the browser content Cb is prevented from being willfully designated by anyone other than the service provider without proper authorization.

Third Embodiment

Figure 15:
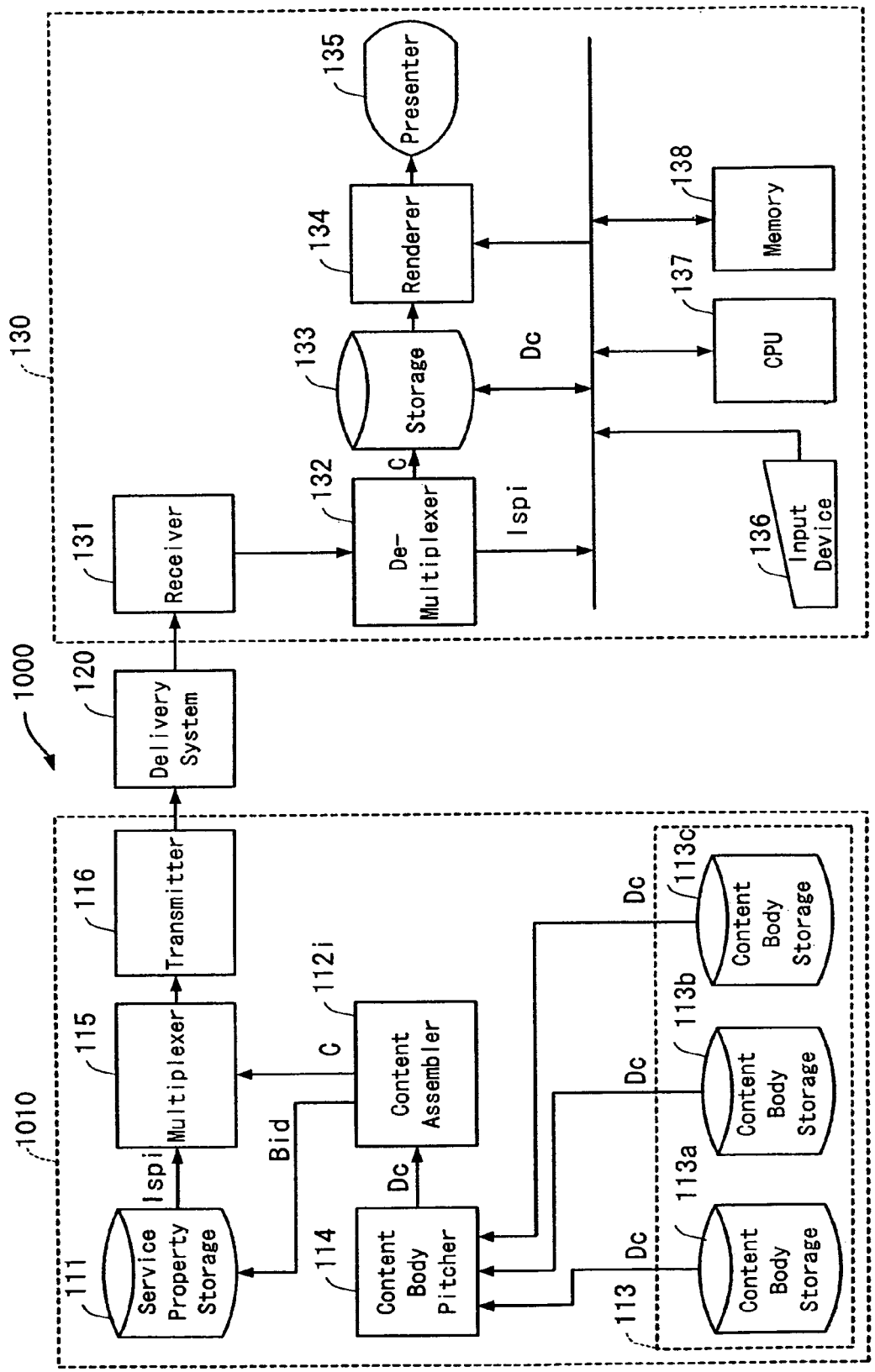
FIG. 15 is a block diagram showing the structure of a storage-based broadcasting system according to a third embodiment of the present invention.

With reference to FIGS. 15, 16, 17, and 18, a storage-based broadcasting system according to a third embodiment of the present invention is now described. As shown in FIG. 15, a storage-based broadcasting system 1000 according to the third embodiment includes a transmitting apparatus 1010, a delivery system 120, and a receiving apparatus 130, as in the storage-based broadcasting system 100 shown in FIG. 1. The transmitting apparatus 1010 is similar in structure to the transmitting apparatus 110 of the storage-type broadcasting system 100 of the first embodiment of the present invention, except that the content assembler 112 of the transmitting apparatus 110 in the storage-based broadcasting system 100 is replaced with a content assembler 112i. Therefore, the same features as those of the storage-based broadcasting system 100 are not described herein, and only the features unique to the storage-type broadcasting system 1000 are mainly described below.

The content assembler 112i has the same functions as those of the content assembler 112 and also has other functions as follows. That is, the content assembler 112i designates a browser content Cbi among the plurality of content bodies Dc stored in the content body storages 113a, 113b, and 113c. The content assembler 112i then extracts the content ID and the content version of the designated content (browser content Cbi) as browser designation information Bid. The content assembler 112i then outputs the extracted browser designation information Bid to the service property storage 111.

Figure 16:
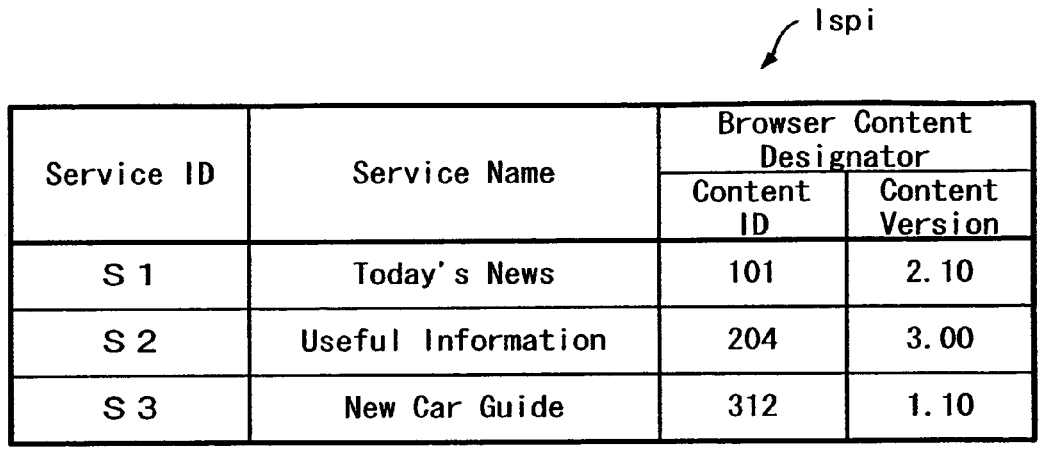
FIG. 16 is a diagram for assisting in explaining service property information in the storage-based broadcasting system shown in FIG. 15.

Based on the browser designation information Bid, the service property storage 111 writes the content ID and content version of the browser content Cb in the service property information Isp, as shown in FIG. 16. That is, the service property information Ispi has a browser content designator composed of the content ID and the content version. One browser content designator is provided for each service. Therefore, the browser content Cb (Cbi) can be discriminated from other contents. As such, the service property information Isp with the content ID and content version of the browser content Cbi written therein is referred to as the service property information Ispi for identification.

Designation of the browser content Cbi is made not by the browser content flag of a content header HcBi, but by the content assembler 112i selecting the content.

Figure 17:
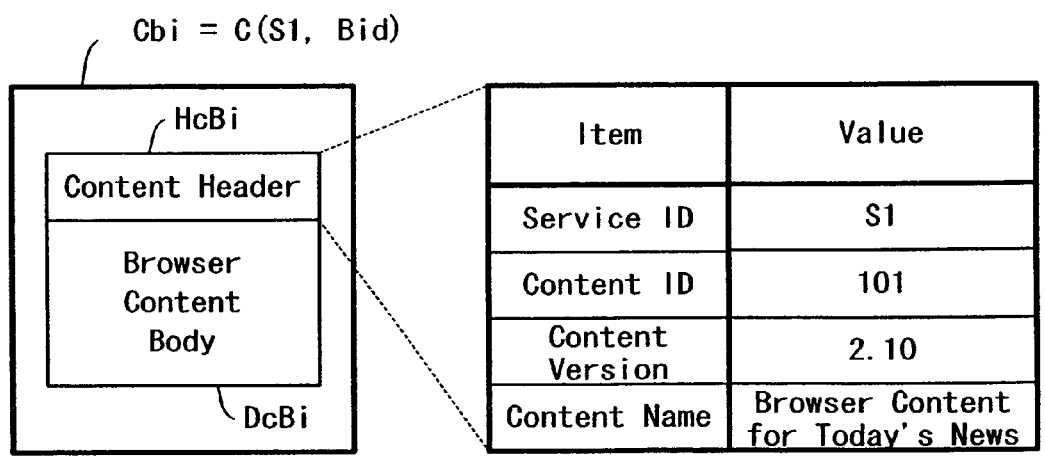
FIG. 17 is a diagram for assisting in explaining a browser content in the storage-based broadcasting system shown in FIG. 15.

In FIG. 17, one example of a content header HcBi is shown. Designation of the browser content Cbi is not made by the browser content flag Bflg. Therefore, the content header HcBi does not include a row for the browser content flag Bflg. Moreover, in the content header, the service content Cs and the browser content Cb cannot be discriminated from each other. In the example shown, a human-readable character string in a "content name" row seems to make it possible to be able to recognize whether the content is the browser content Cb or not. However, in the level of the transmitting apparatus 1010 and the receiving apparatus 130, such recognition cannot be made.

As such, in the storage-based broadcasting system 1000, the receiving apparatus 130 is identical in structure to its counterpart of the storage-based broadcasting system 100, but is slightly different in operation because of different program code and data stored therein.

Figure 18:
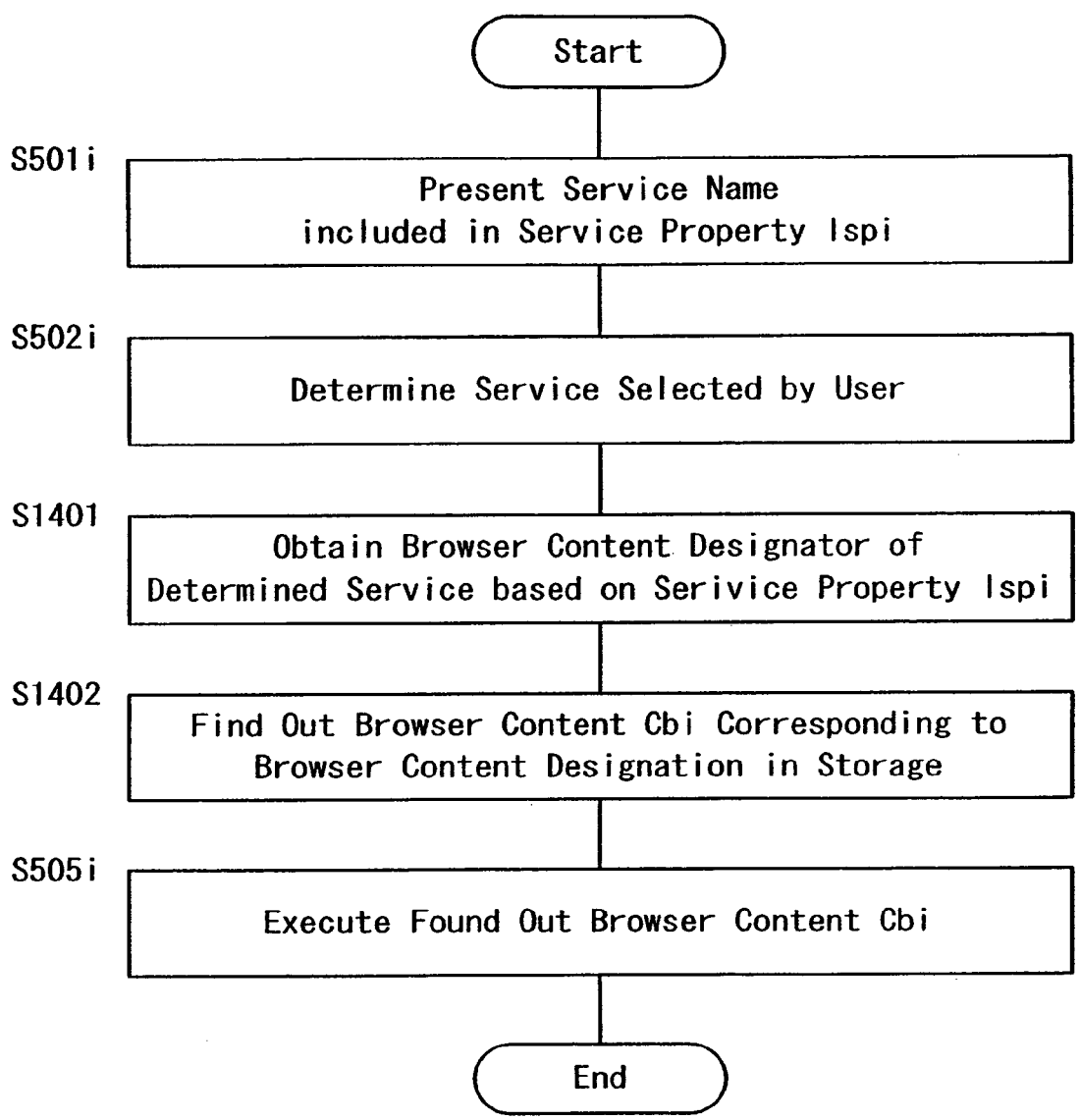
FIG. 18 is a flow chart showing the operation to execute the browser content by the receiving apparatus shown in FIG. 15.

With reference to a flow chart shown in FIG. 18, the process of activating the browser content Cbi by the receiving apparatus 130 is now described. The process in steps S501i, S502, and S505i is basically the same as that in step S501, S502, and S505, respectively, described with reference to FIG. 9, except that the service property information Isp is replaced with the service property information Ispi, and the target content C is replaced with the browser content Cbi. Therefore, description of the same steps in the above process is not made herein.

In step S1401, by referring to the service property information Ispi, the browser content designator of the determined service is extracted.

In step S1402, the storage 133 is searched for the content C (browser content Cbi) with the content ID and content version of the browser content designator extracted in step S1401. Then, the found content C is designated as the browser content Cbi.

Designation of the browser content Cbi is carried out by the content assembler 112i. Therefore, if the content assembler 112i is managed properly, redundant designation of the browser content Cbi or erroneous designation of other service contents C as the browser content Cbi can be prevented.

As stated above, in this embodiment, the content body pitcher 114 sends the bodies of the browser contents Cbi which each provide a user interface with a service. The service property storage 111 sends, as the browser content designator used for all services in common, the browser designation information Bid for designating the browser content body DCb among a plurality of contents as being included in the service property information Ispi. The receiving apparatus 130 determines, based on the browser content designator, whether the content C is the browser content Cbi. With these components provided, the storage-based broadcasting system 100 ensures discrimination between the browser content Cb and the service content Cs can be achieved.

In other words, in the third embodiment, the browser content Cb is designated by the control content designator used for the plurality of services in common. Then, the designation information of the browser content Cb is separated from the content and content header. Thus, willful designation of the browser content Cb for another service can be prevented irrespectively of the information stored in the content body storage. For example, the designation information of the browser content Cb may be managed under the control of a contract broadcasting company instead of each service provider so as to prevent designation of an authorized browser content Cb among the service providers.

Fourth Embodiment

Figure 19:
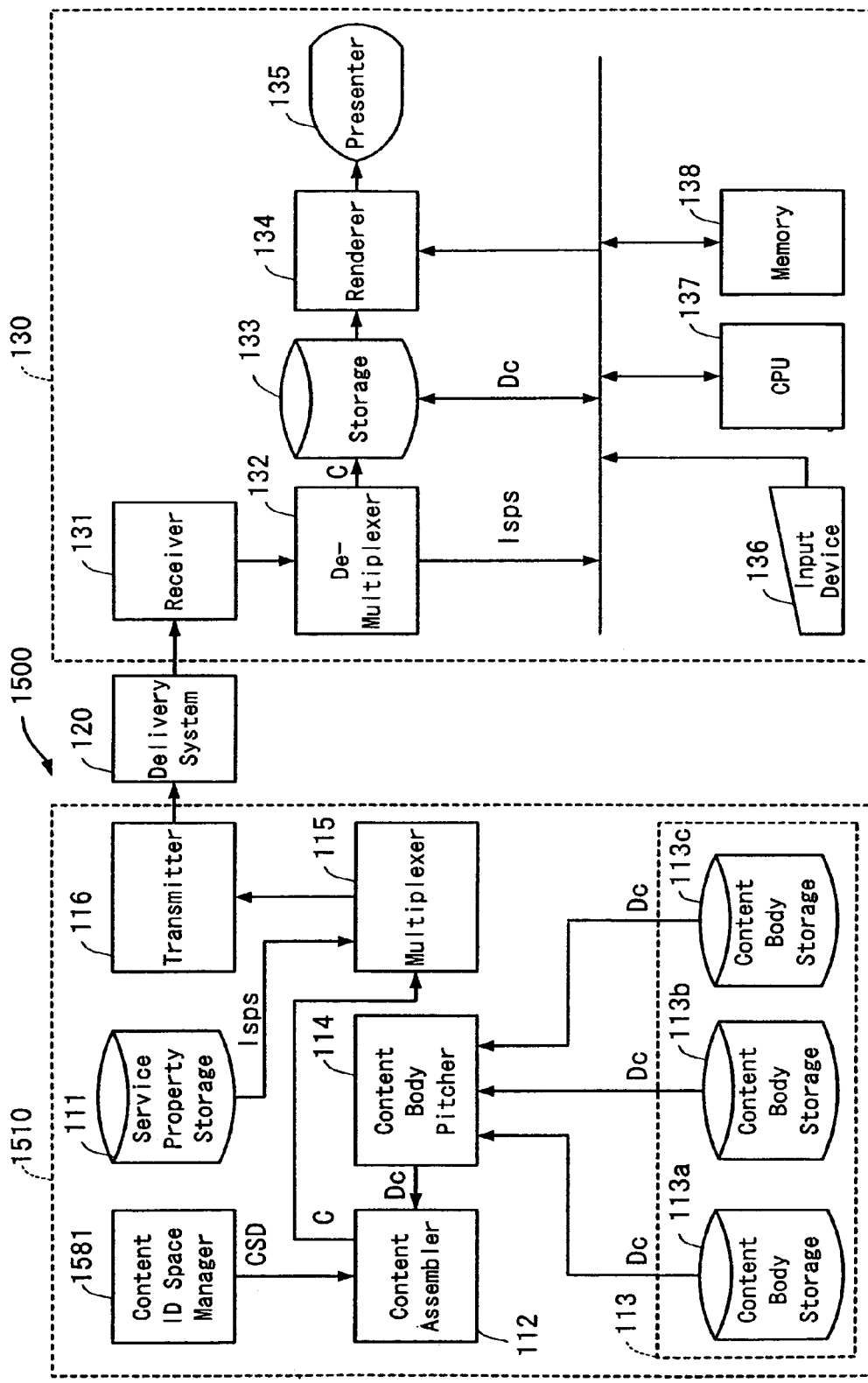
FIG. 19 is a block diagram showing the structure of a storage-based broadcasting system according to a fourth embodiment of the present invention.

With reference to FIGS. 19, 20, 21, 22, and 23, a storage-based broadcasting system according to a fourth embodiment of the present invention is described. As shown in FIG. 19, a storage-based broadcasting system 1500 according to the fourth embodiment includes a transmitting apparatus 1510, a delivery system 120, and a receiving apparatus 130, as in the storage-based broadcasting system 100 shown in FIG. 1. The transmitting apparatus 1510 is identical in structure to the transmitting apparatus 110 of the storage-based broadcasting system 100 of the first embodiment of the present invention, except that a content ID space manager 1581 is additionally provided.

The same features as those in the storage-based broadcasting system 100 of the first embodiment of the present invention, are not described herein, and only the features unique to the storage-based broadcasting system 1500 of the fourth embodiment are described below.

The content ID space manager 1581 manages a range (space) of values that can be taken by the content ID of the content for the service so as to designate the browser content Cbs.

The content ID space is defined in a predetermined manner. For example, the content IDs 100 to 199 indicate the content of the service ID "S1"; 200 to 299 indicate the content of the service ID "S2"; 300 to 399 indicate the content of the service ID "S3"; and 0 to 99 indicate the browser content Cb (Cbc).

The content ID space manager 1581 generates a content space definition CSD to be output to the content assembler 112. Based on the content space definition CSD, the content assembler 112 rewrites the values of the content IDs stored in the content headers Hc (HcBs) for the content bodies Dc (DcBs) provided from the content storages 113a, 113b, and 113c via the content body pitcher 114. Thus, values of the content IDs are replaced with those according to the defined content ID space.

Figures 20, 21, 22:
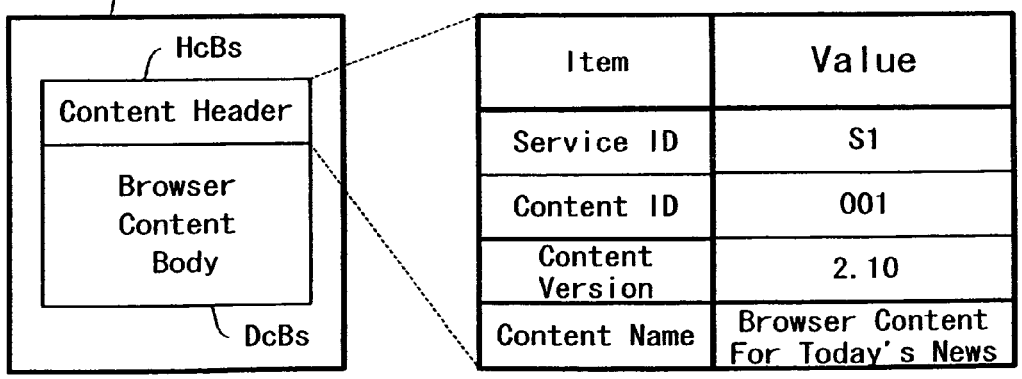
FIG. 20 is a diagram for assisting in explaining service property information in the storage-based broadcasting system shown in FIG. 19.
FIG. 21 is a diagram for assisting in explaining a content ID in the storage-based broadcasting system shown in FIG. 19.
FIG. 22 is a diagram for assisting in explaining a browser content in the storage-based broadcasting system shown in FIG. 19.

In FIG. 21, one example of the content space definition is shown. The content space definition CSD includes a column for the range of the content ID and a column containing information for defining the content space. In this example, contents for the services are created with their content IDs arbitrarily set within the range of 0 to 99, and the contents are stored in each content body storage. For the service S1, the browser content Cbs generated from the content body Dc provided by the content body storage 113a is outputted if its content ID is between 0 and 99. At this time, if the content ID is not between 0 and 99, the browser content Cbs is assumed to be unauthorized, and is then excluded.

On the other hand, for the service content Cs for the service S1, 100 is added to the content ID for the conversion thereof within 100 to 199. After conversion, it is checked whether the content ID is within 100 and 199. If the content ID is within this range, the service content Cs is outputted and, if not, the service content Cs is assumed to be unauthorized, and is then excluded.

At conversion, the content ID for reference of other content embedded in the browser content is also converted in a similar manner.

In FIG. 22, the structure of the browser content Cbs replaced by the content ID space manager 1501 is exemplarily shown. In the content header HcBs of the browser content Cbs, the content ID is "001", which is within 0 to 999 defined as the content ID range of the browser content Cb.

The content ID space manager 1501 also adds information for defining the content ID space to the service property information Isps stored in the service property storage 111.

In FIG. 20, one example of service property information Isps is shown. The service property information Isps is the same as the service property information Isp according to the first embodiment shown in FIG. 4.

Figure 23:
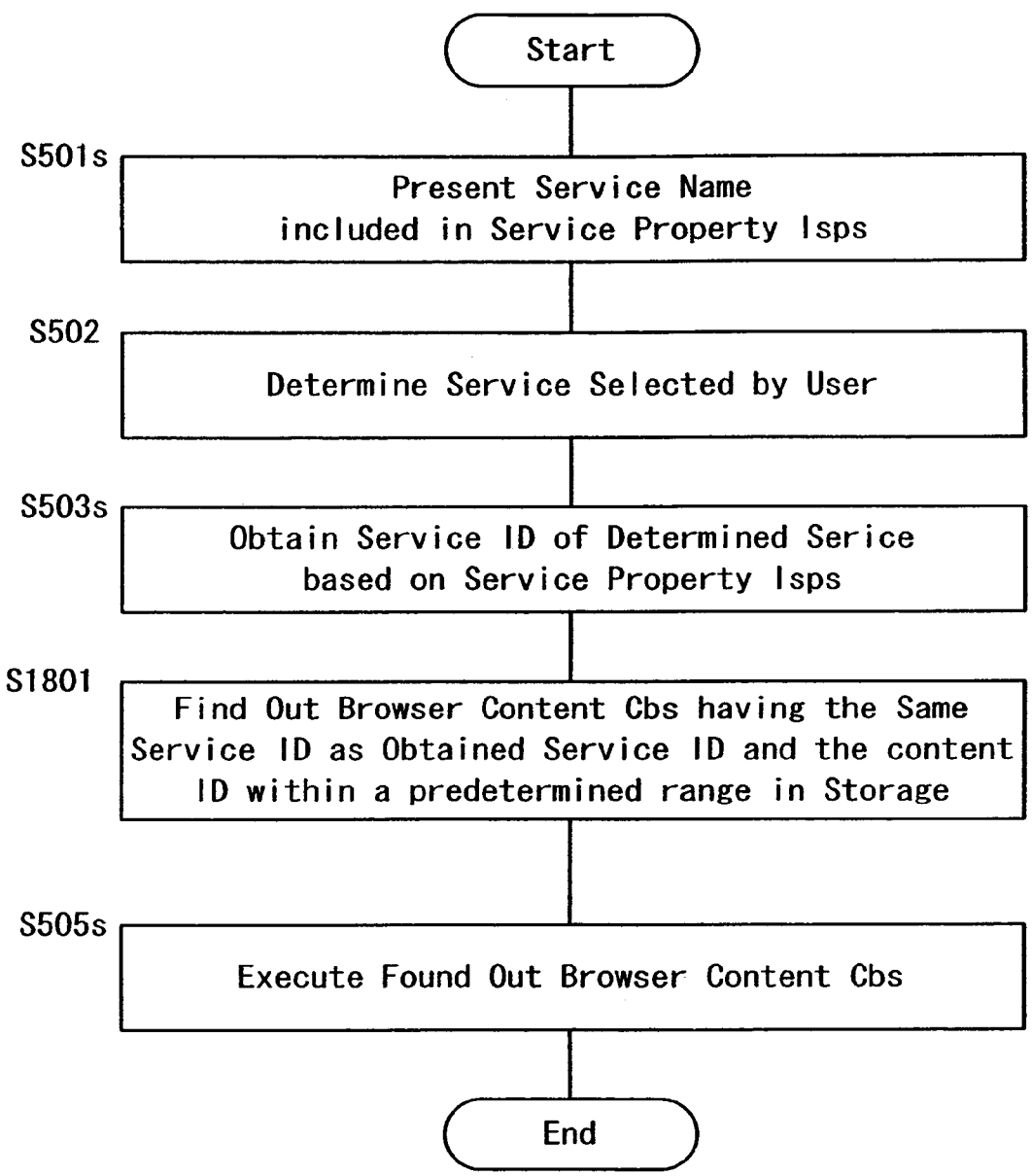
FIG. 23 is a flow chart showing the operation to execute the browser content by a receiving apparatus shown in FIG. 19.
Figure 24:
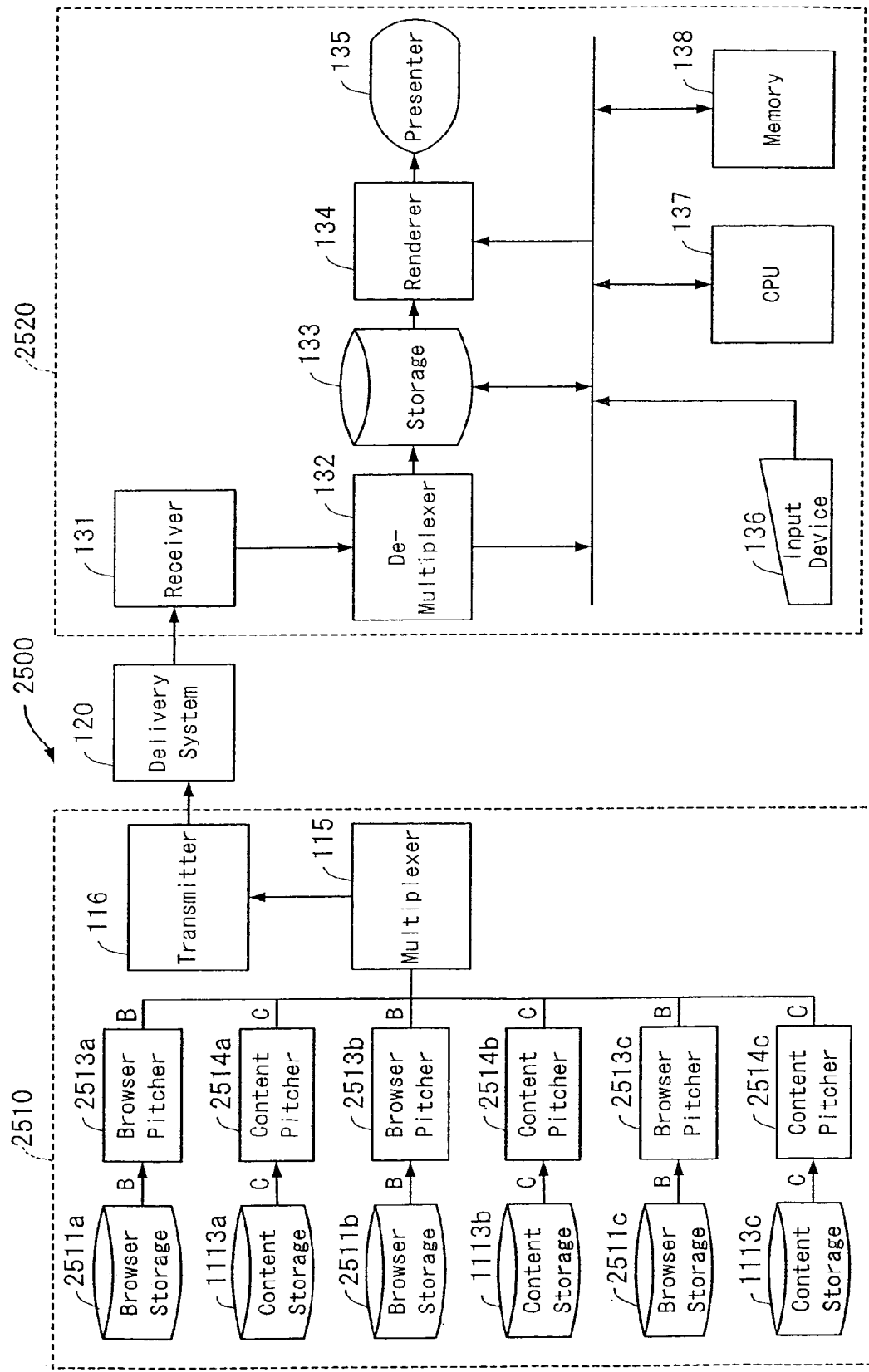
FIG. 24 is a block diagram showing the structure of a conventional storage-based broadcasting system.
Figure 26:
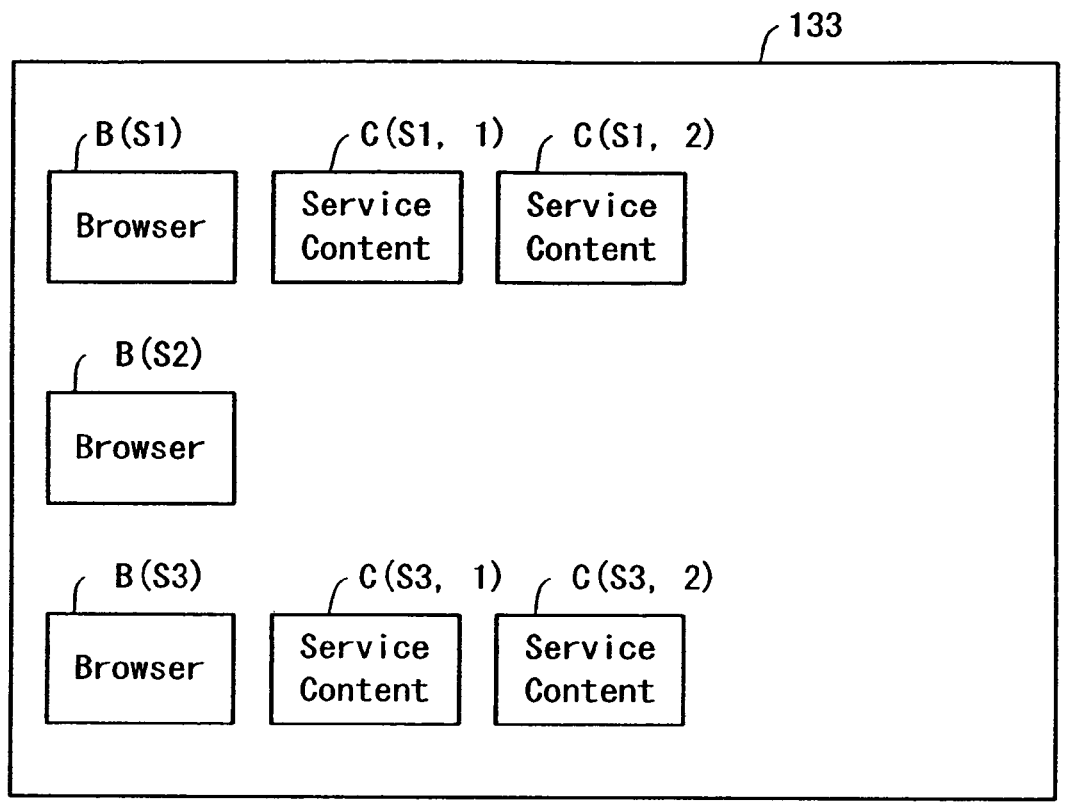
FIG. 26 is a diagram schematically showing one example of contents and browsers stored in a storage shown in FIG. 24.
Figure 27:
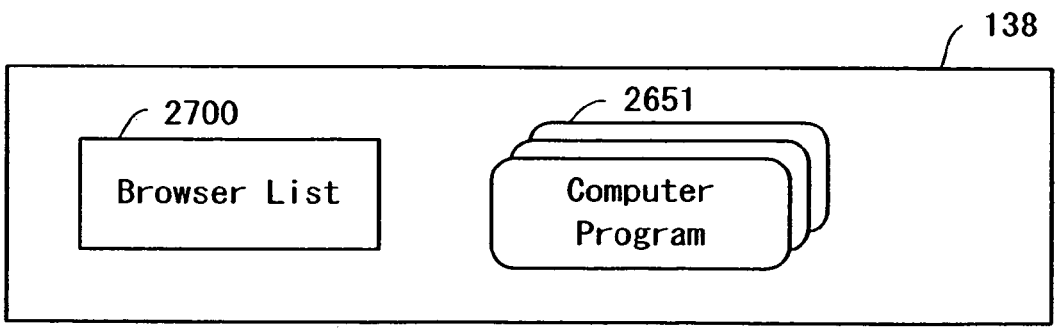
FIG. 27 is a diagram schematically showing information stored in a memory shown in FIG. 24.
Figure 28:
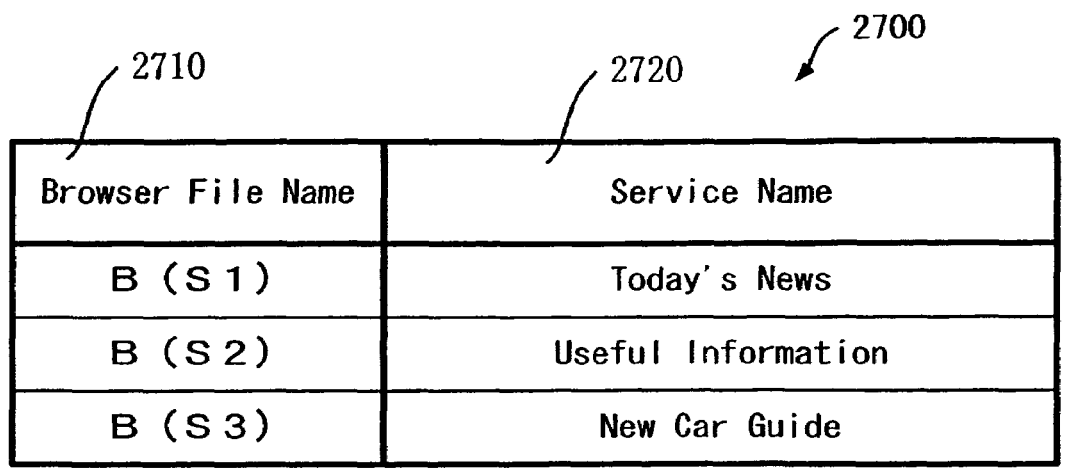
FIG. 28 is a diagram for assisting in explaining service property information in the storage-based broadcasting system shown in FIG. 24.
Figure 29:
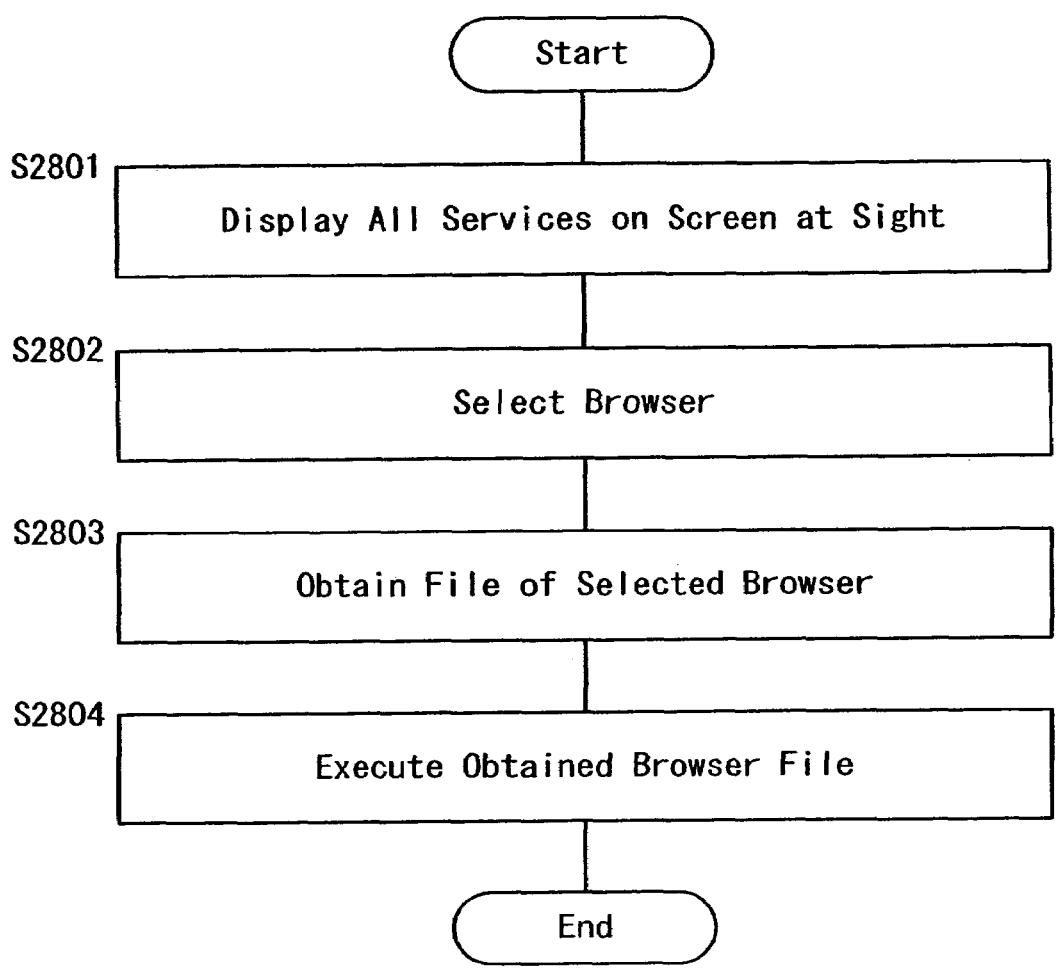
FIG. 29 is a flow chart showing the operation to execute the browser by a receiving apparatus shown in FIG. 24.
Figure 30:
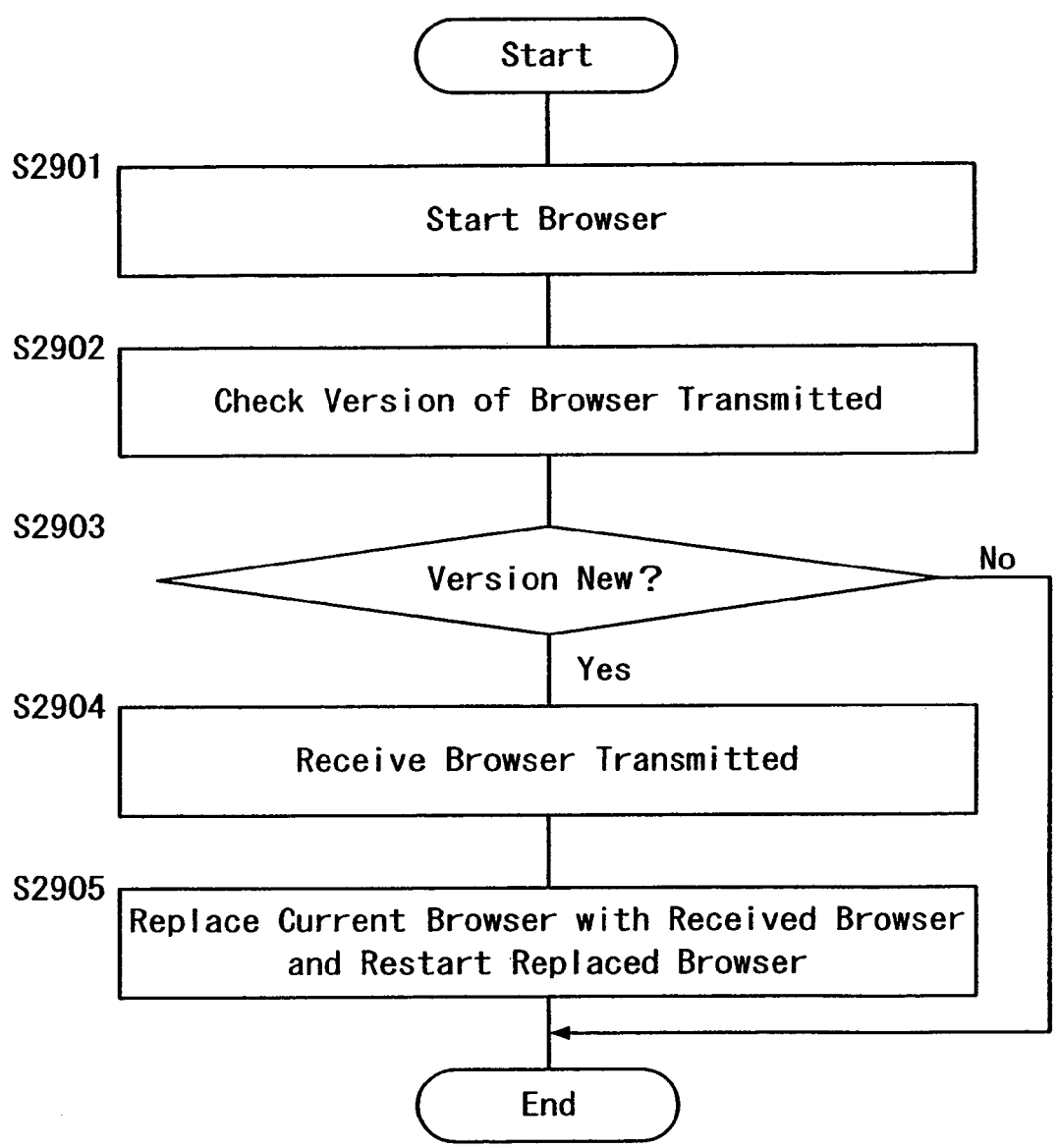
FIG. 30 is a flow chart showing the operation to update the browser by the receiving apparatus shown in FIG. 24.

With reference to FIG. 23, the process of activating the browser content Cbs by the receiving apparatus 130 is now described. The process in steps S501s, S502, S503, and S505s is basically the same as that in steps S501, S502, S503, and S505, respectively, described with reference to FIG. 9, except that the service property information Isp is replaced with the service property information Isps, and the target content C is replaced with the browser content Cbs. Therefore, description of the same steps in the process is not made herein.

In step S1801, the storage 133 is searched for the content C which has the service ID obtained in step S503 and which has the content ID within the range of values equal to that of the browser content Cbs designated by the service property information Isps.

In step S505s, the found browser content Cbs is executed.

As stated above, the storage-based broadcasting system 1500 manages the space of the content ID. The content having the content ID of a specific value defined under this management can be designated as the browser content Cbs. As such, without a specific field (column, in this example) provided for the content header HcBs, etc., the browser content Cbs can be designated.

In other words, as long as the content body Dc can be stored in the content storage 113 only by the content provider, the browser content Cb for another service can be prevented from being willfully specified and executed in the receiving apparatus 130.

In the fourth embodiment of the present invention, if a single content ID space is provided for all service providers, the range of values of the content ID of the browser content Cb is defined in advance. Thus, willful designation of the browser content Cb among the service providers can be prevented. Only the field of the content ID is used, and a new field is not required to be provided to the content header, etc. Therefore, only a slight modification is required to the conventional transmitting apparatus. Moreover, the content receiving process of the conventional receiving apparatus can be used easily.

While the invention has been described in detail, the foregoing description is in all aspects illustrative and not restrictive. It is understood that numerous other modifications and variations can be devised without departing from the scope of the invention.

What is claimed is:

1. A storage-based broadcasting system which stores a plurality of contents to provide a service and an executable browser used for browsing the service, the system comprising:
    transmission means for transmitting the plurality of contents; and
    receiving means for receiving the plurality of contents from said transmission means via a transmission path, and executing the browser, wherein:
    said transmitting means comprises,
        first storage means for storing a service content body and a browser content body, the service content body being for providing the service, and the browser content body being generated from the browser in the same format as the service content body such that the service content body and the browser content body are stored as a common content body or entity,
        a content body pitcher for outputting the service content body and the browser content body stored in said first storage means as the common content body or entity,
        content assembler means for assembling contents in the same format by adding a content header for defining each of the contents to the service content body and the browser content body outputted from said content body pitcher,
        multiplexer means for multiplexing the content assembled by said content assembler means, and
        transmitter means for modulating the contents multiplexed by said multiplexer means and outputting the modulated contents, which contain the service content body and the browser content body, to said receiving means,
    wherein said receiving means comprises,
        de-multiplexing means for temporarily holding the received contents and extracting information contained in the content header of the received contents,
        second storage means for storing the contents,
        control means for updating the contents having been stored in said second storage means with the contents held in said de-multiplexing means when it is determined, based on the information extracted from the content header, that a content of the same kind and version as the contents held in said de-multiplexing means is not stored in said second storage means,
    wherein said control means is further for selecting a content, including the browser content body, from among the contents stored in said second storage means, based on the content header contained in each of the contents being stored in said second storage means, and for executing the browser content body included in the selected content.

2. The storage-based broadcasting system in accordance with claim 1, wherein:
said transmission means further comprises service property information transmitting means for transmitting service property information for indicating properties of the service;
said receiving means is further for receiving the transmitted service property information; and
said control means is further for determining a content, including the browser content body, among the plurality of received contents based on the service property information in addition to the content header.

3. The storage-based broadcasting system in accordance with claim 2, wherein:
said transmission means further comprises electronic signature means for placing an electronic signature on the content including the browser content body;
said service property transmitting means is further for transmitting a public key of the electronic signature as being included in the service property information;
said receiving means further comprises signature authentication means for authenticating the electronic signature by using the public key included in the received service property information; and
said control means is further for determining the content, including the browser content body, among the plurality of received contents through authentication of the electronic signature.

4. The storage-based broadcasting system in accordance with claim 3, wherein the key used for authentication of the electronic signature is unique to the service.

5. The storage-based broadcasting system in accordance with claim 2, wherein:
said content pitcher further comprises content ID space management means for sending information for defining a part of an ID space of the content; and
said receiving means further comprises designation means for designating the content, including the browser content body, based on a content ID included in the defined part of the ID space.

6. A content transmission method performed in a storage-based broadcasting system which stores a plurality of contents to provide a service and an executable browser used for browsing the service, the method comprising:
transmitting the plurality of contents;
receiving the plurality of contents via a transmission path; and
executing the browser, wherein:
said transmitting of the plurality of contents comprises,
storing a service content body and a browser content body, the service content body being for providing the service, and the browser content body being generated from the browser in the same format as the service content body such that the service content body and the browser content body are stored as a common content body or entity,
outputting the stored service content body and the browser content body as the common content body or entity, and
assembling contents in the same format by adding a content header for defining each of the contents to the outputted service content body and the browser content body,
multiplexing the assembled content,
modulating the multiplexed content, and
transmitting the modulated contents which contain the service content body and the browser content body;
wherein said receiving of the plurality of content comprises,
temporarily-holding the received contents,
extracting information contained in the content header of the received contents,
storing the contents,
updating the stored contents with the contents temporarily-held when it is determined, based on the information extracted from the content header, that a content of the same kind and version as the contents temporarily-held is not stored,
selecting a content, including the browser content body, from among the contents stored, based on the content header contained in each of the contents having been stored, and
executing the browser content body included in the selected content.

7. The content transmission method in accordance with claim 6, wherein:
said transmitting of the plurality of contents further comprises transmitting service property information for indicating properties of the service; and
said receiving of the plurality of contents comprises
receiving the transmitted service property information, and
determining a content, including the browser content body, among the plurality of received contents based on the service property information in addition to the content header.

8. The content transmission method in accordance with claim 7, wherein:
said transmitting of the plurality of contents further comprises placing an electronic signature on the content including the browser content body;
said transmitting of the service property information further comprises transmitting a public key of the electronic signature as being included in the service property information; and
said receiving of the plurality of content further comprises
authenticating the electronic signature by using the public key included in the received service property information, and
determining the content, including the browser content body, among the plurality of received contents through authentication of the electronic signature.

9. The content transmission method in accordance with claim 8, wherein the key used for authentication of the electronic signature is unique to the service.

10. The storage-based broadcasting system in accordance with claim 7, wherein:
said transmitting of the plurality of contents further comprises sending information for defining a part of an ID space of the content; and
said receiving of the plurality of contents further comprises designating the content, including the browser content body, based on a content ID included in the defined part of the ID space.

11. A storage-based broadcasting system operable to store a plurality of contents to provide a service and an executable browser used for browsing the service, the system comprising:
a transmission unit operable to transmit the plurality of contents; and
a receiving unit operable to receive the plurality of contents from the transmission unit via a transmission path, and execute the browser, wherein:
said transmitting unit comprises, a first storage unit operable to store a service content body and a browser content body, the service content body being for providing the service, and the browser content body being generated from the browser in the same format as the service content body such that the service content body and the browser content body are stored as a common content body or entity, a content body pitcher unit operable to output the service content body and the browser content body stored in said first storage unit as the common content body or entity, and a content assembler operable to assemble contents in the same format by adding a content header for defining each of the contents to the service content body and the browser content body outputted from said content body pitcher unit, a multiplexer operable to multiplex the contents assembled by said content assembler, and a transmitter operable to modulate the contents multiplexed by said multiplexer and output the modulated contents, which contain the service content body and the browser content body, to said receiving unit, wherein said receiving unit comprises, a de-multiplexer operable to temporarily hold the received contents and extract information contained in the content header of the received contents, a second storage unit operable to store the contents, a controller operable to update the contents having been stored in said second storage unit with the contents held in said de-multiplexer when it is determined, based on the information extracted from the content header, that a content of the same kind and version as the contents held in the de-multiplexer is not stored in the second storage means, wherein the controller is further operable to select a content, including the browser content body, from among the contents stored in said second storage unit, based on the content header contained in each of the contents being stored in said second storage unit, and execute the browser content included in the selected content.

12. The storage-based broadcasting system in accordance with claim 11, wherein:

said transmission unit further comprises a service property information transmitting unit operable to transmit service property information for indicating properties of the service;

said receiving unit is operable to receive the transmitted service property information; and said controller is operable to determine a content, including the browser content body, among the plurality of received contents based on the service property information in addition to the content header.

13. The storage-based broadcasting system in accordance with claim 12, wherein:

said transmission unit further comprises a signature generator unit operable to place an electronic signature on the content including the browser content body;

said service property transmitting unit is further operable to transmit a public key of the electronic signature as being included in the service property information;

said receiving unit further comprises a signature authentication unit operable to authenticate the electronic signature by using the public key included in the received service property information; and said controller is operable to determine the content, including the browser content body, among the plurality of received contents through authentication of the electronic signature.

14. The storage-based broadcasting system in accordance with claim 13, wherein the key used for authentication of the electronic signature is unique to the service.

15. The storage-based broadcasting system in accordance with claim 12, wherein the content pitcher unit further comprises a content ID space management unit operable to send information for defining a part of an ID space of the content, and the receiving unit further comprises a designator operable to designate the content, including the browser content body, based on a content ID included in the defined part of the ID space.

16. The storage-based broadcasting system in accordance with claim 11, wherein the storage-based broadcasting system further comprises a delivery unit operable to receive the content including the browser content body transmitted by said transmission unit, and transmit the transmitted content including the browser to said receiving unit.

17. The storage-based broadcasting system in accordance with claim 16, wherein:

said transmission unit is operable to transmit the content as a digital bit stream to said delivery unit; and said delivery unit is operable to transmit the transmitted content as a digital bit stream to the receiving unit.

* * * * *